US010228746B1

(12) United States Patent
Ram et al.

(10) Patent No.: US 10,228,746 B1
(45) Date of Patent: Mar. 12, 2019

(54) DYNAMIC DISTRIBUTED POWER CONTROL CIRCUITS

(71) Applicant: WESTERN DIGITAL TECHNOLOGIES, INC., San Jose, CA (US)

(72) Inventors: Voleti Siva Raghu Ram, Bangalore (IN); Bhavin Odedara, Bangalore (IN); Sitaram Banda, Bangalore (IN); Nitin Gupta, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/832,528

(22) Filed: Dec. 5, 2017

(51) Int. Cl.
*G06F 1/26* (2006.01)
*G06F 1/32* (2006.01)
*G06F 1/3206* (2019.01)
*G06F 1/324* (2019.01)
*G06F 1/3225* (2019.01)
*G06F 1/3212* (2019.01)

(52) U.S. Cl.
CPC .............. *G06F 1/3206* (2013.01); *G06F 1/26* (2013.01); *G06F 1/263* (2013.01); *G06F 1/324* (2013.01); *G06F 1/3212* (2013.01); *G06F 1/3225* (2013.01)

(58) Field of Classification Search
CPC . G06F 1/26; G06F 1/263; G06F 1/266; G06F 1/32–1/3231
See application file for complete search history.

(56) References Cited

U.S. PATENT DOCUMENTS

| | | | |
|---|---|---|---|
| 9,418,712 B1 | 8/2016 | Erez | |
| 2002/0063573 A1* | 5/2002 | Genova | G01R 19/16519 324/764.01 |
| 2003/0137787 A1* | 7/2003 | Kumar | G06F 1/26 361/18 |
| 2008/0040563 A1* | 2/2008 | Brittain | G06F 1/3225 711/154 |
| 2010/0013304 A1* | 1/2010 | Heineman | G06F 1/26 307/31 |
| 2011/0296211 A1* | 12/2011 | Ramaraju | G06F 1/3203 713/320 |
| 2014/0070879 A1* | 3/2014 | Kawasaki | G06F 1/3203 327/543 |
| 2014/0181546 A1* | 6/2014 | Hallberg | G06F 1/3206 713/320 |
| 2014/0195065 A1* | 7/2014 | Yang | H02M 3/33523 700/298 |
| 2014/0237272 A1* | 8/2014 | Sadowski | G06F 1/3275 713/320 |
| 2015/0022166 A1* | 1/2015 | Bisson | G05F 1/575 323/280 |
| 2015/0130477 A1* | 5/2015 | Berland | G01R 31/3277 324/550 |
| 2016/0370841 A1 | 12/2016 | Erez | |
| 2017/0102760 A1* | 4/2017 | Duell | G06F 1/3296 |
| 2017/0185125 A1* | 6/2017 | Lin | G06F 1/266 |

* cited by examiner

*Primary Examiner* — Duc M Nguyen
(74) *Attorney, Agent, or Firm* — Vierra Magen Marcus LLP

(57) ABSTRACT

An apparatus includes a circuit and a voltage regulator having a first output terminal that is coupled to provide electrical power to the circuit. The voltage regulator is configured to provide the electrical power in a supply voltage range. The voltage regulator has a second output terminal configured to provide an indicator of electrical current provided by the first output terminal for control of the circuit.

16 Claims, 19 Drawing Sheets

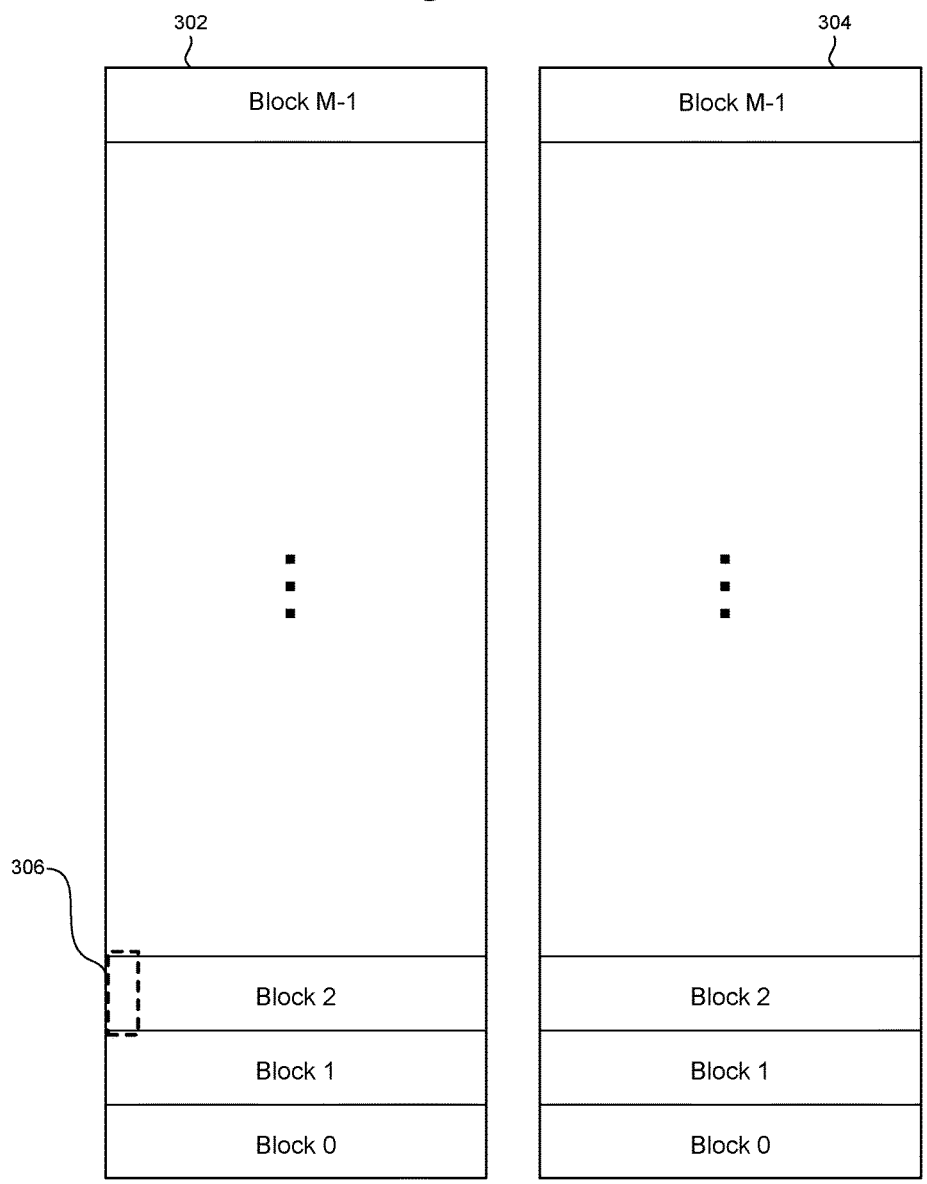

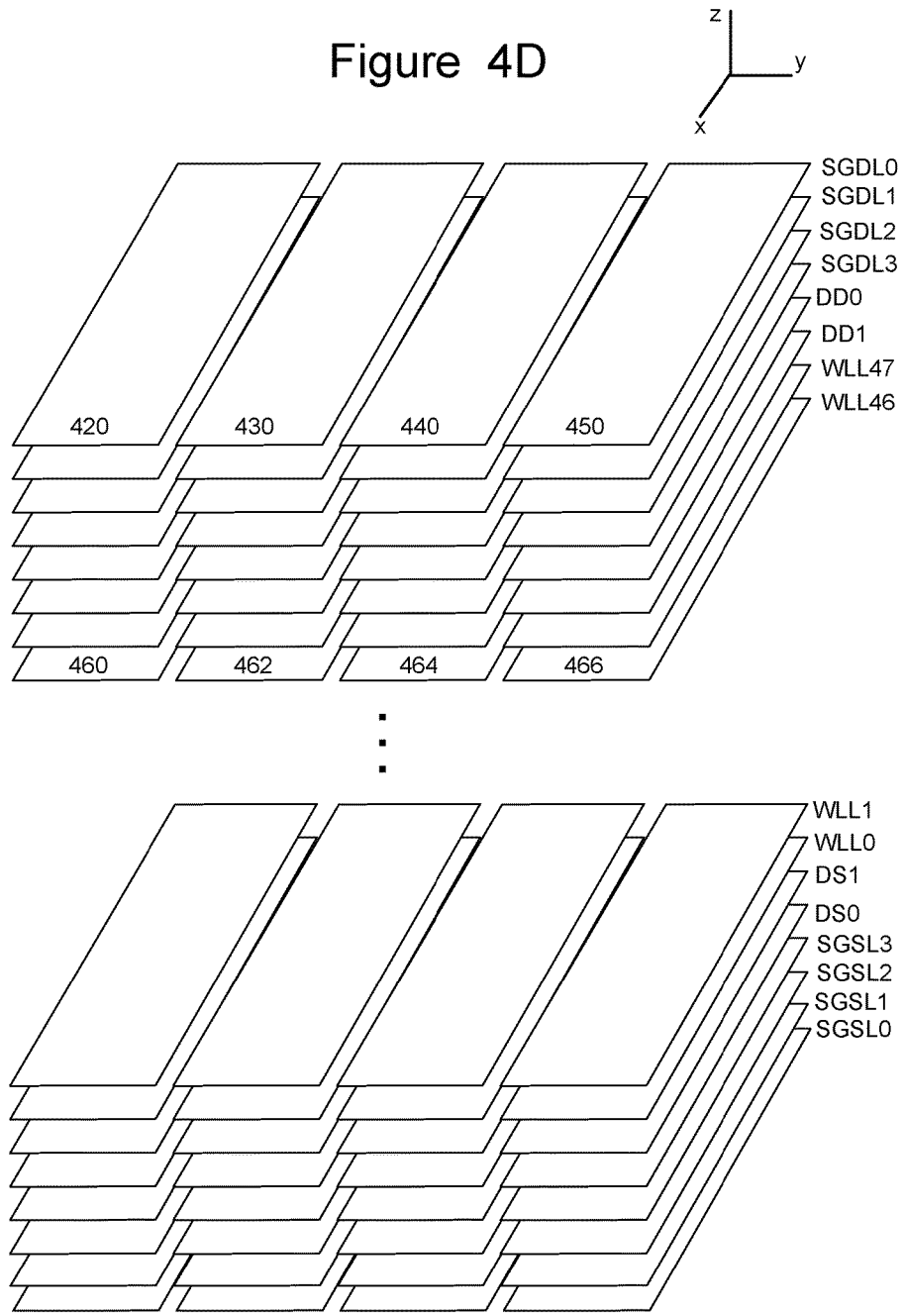

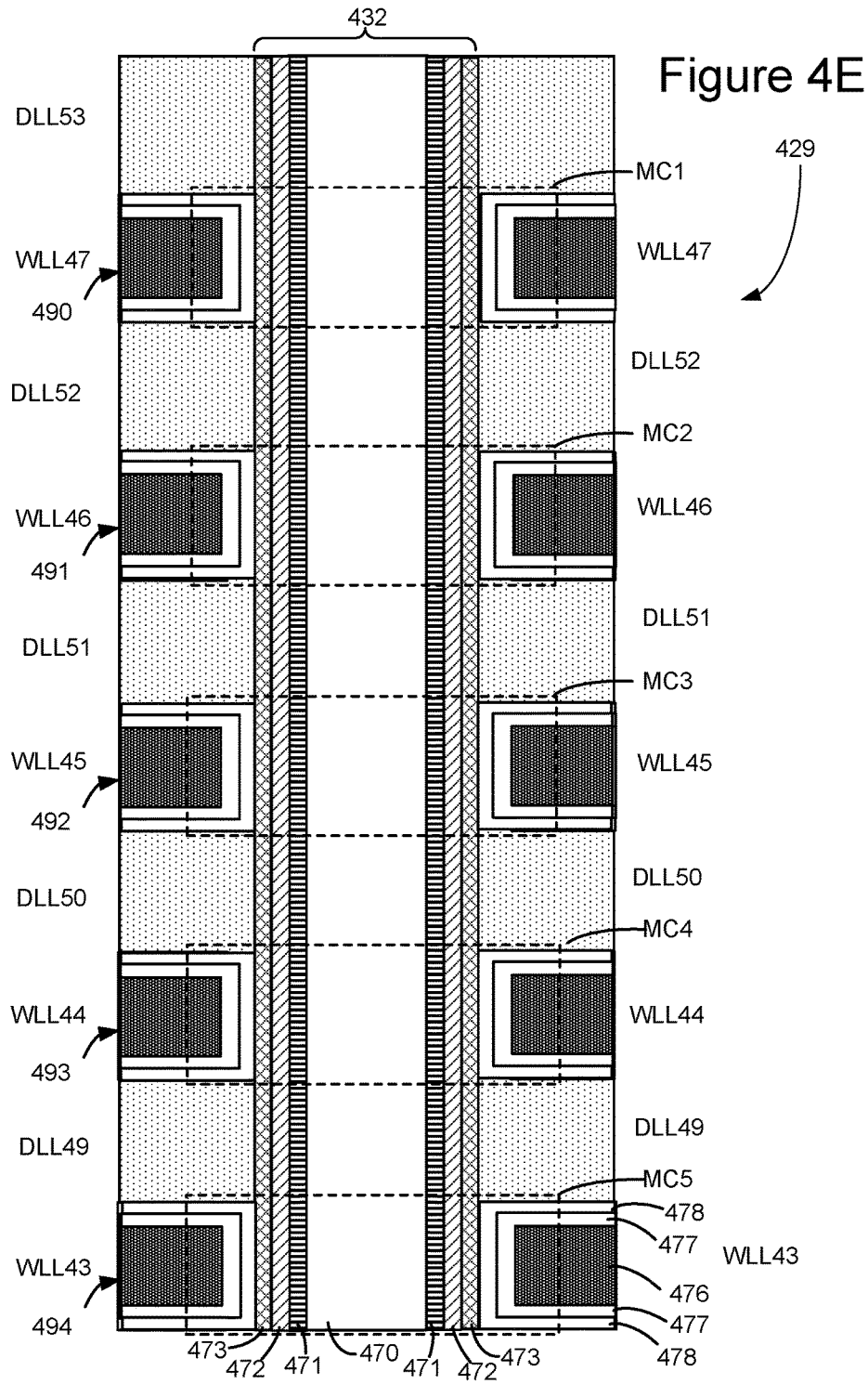

DYNAMIC DISTRIBUTED POWER CONTROL CIRCUITS

BACKGROUND

Integrated circuits are used in a wide variety of systems, including communications systems, entertainment systems, navigation systems, data storage systems, and other systems. Examples of integrated circuits (ICs) include semiconductor memory (including non-volatile memory such as NAND flash), controllers (including memory controllers), programmable logic devices (PLDs), digital signal processing (DSP) devices, communication ICs, and application specific ICs (ASICs). Integrated circuits may receive power at some regulated voltage, e.g. from a voltage regulator that is located off-chip. Voltage regulation may also be provided on-chip by a voltage regulator that is located on the same substrate (e.g. same silicon die) as the circuit or circuits that it provides power to.

Semiconductor memory is widely used in various electronic devices such as cellular telephones, digital cameras, personal digital assistants, medical electronics, mobile computing devices, and non-mobile computing devices. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM). ICs in a semiconductor memory may receive power from one or more voltage regulators.

BRIEF DESCRIPTION OF THE DRAWINGS

Like-numbered elements refer to common components in the different figures.

FIG. 4A is a block diagram of a memory structure having two planes.

FIG. 4D depicts a view of the select gate layers and word line layers.

FIG. 4E is a cross sectional view of a vertical column of memory cells.

DETAILED DESCRIPTION

Figure 1:
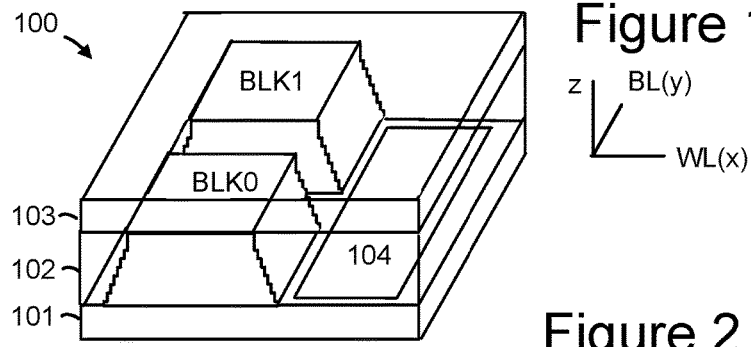
FIG. 1 is a perspective view of a 3D stacked non-volatile memory device.

In some systems, including non-volatile memory systems, a voltage regulator may be used to provide electrical power to one or more circuits within a specified voltage range. Such circuits may use varying amounts of power depending on what operations they are performing. In some cases, a voltage regulator may provide power to a circuit or circuits that have a limited power budget. For example, a voltage regulator may provide power for a subsystem, where the subsystem is allocated up to some power limit, e.g. a limit of 1 watt in a system that uses 10 watts, or 10% of system power.

Generally, power consumed by electrical circuits, including ICs, generates heat that may increase temperature of an assembly that includes the electrical circuit above an external temperature. This may cause overheating in some cases, e.g. certain power consumption levels in combination with certain external conditions may increase temperature above a temperature limit and trigger a thermal event shut-off event or trigger a power-saving mode. The temperature of a heat-producing device in an IC ("junction temperature") may be higher than the ambient temperature in a system (e.g. ambient temperature in housing or enclosure), which may be higher than an external temperature where the system is located. It will be understood that power is related to voltage and current according to the equation $P=V*I$ (where P is power, V is voltage, and I is current) so that, for a constant voltage, power consumption is proportional to current and a power limit may be expressed as a current limit.

Aspects of the present technology facilitate maintaining power consumption of electrical circuits within a power limit and/or maintaining temperature of an assembly below a temperature limit in an efficient matter that does not unnecessarily limit power consumption. For example, a voltage regulator may provide electrical power to a circuit in a supply voltage range through a first output terminal. In addition, the voltage regulator may provide an indicator of electrical current provided by the first output terminal via a second output terminal. Providing the indicator of electrical current to the circuit may allow the circuit to control its power consumption in response to the indicator in real time. For example, a controller, processor, ASIC, or other IC may adjust its activity to maintain its power consumption in an acceptable range (e.g. below a predetermined power or current limit). In some cases, the indicator may be provided to a controller that is coupled to the circuit (e.g. a controller that is separate from the circuit) and the controller may be configured to control power consumption of the circuit in response to the indicator (e.g. by reducing a clock frequency, or otherwise reducing activity in the circuit). A controller may receive multiple indicators for multiple circuits and may adjust power consumption of the circuits accordingly.

A temperature transducer may be provided to allow temperature to be measured and recorded. Power or current consumption may be recorded also so that one or more patterns of electrical current consumption associated with temperatures above a temperature limit patterns of activity may be identified and correlated with temperature. A pattern detection circuit may detect a particular pattern that is predictive of exceeding a temperature limit and may adjust activity to avoid exceeding the temperature limit. Thus, corrective action may be taken before the temperature limit is reached which may be preferable to an overtemperature situation.

Where multiple circuits are located in an enclosure so that temperature depends on heat generated by more than one circuit (in addition to external temperature), current consumption of individual circuits may indicate which circuit is a power aggressor (i.e. which circuit or circuits are using significant power and thereby generating significant heat). Power reduction measures can be targeted at power aggressors accordingly rather than reducing or stopping activity of all circuits. Thus, in response to the temperature exceeding a threshold temperature, an aggressor may be identified and its power consumption may be reduced.

FIGS. 1-4F describe one example of a memory system that can be used to implement the technology proposed herein. FIG. 1 is a perspective view of a three-dimensional (3D) stacked non-volatile memory device. The memory device 100 includes a substrate 101. On and above the substrate are example blocks of memory cells, including BLK0 and BLK1, formed of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block of memory cells comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2:
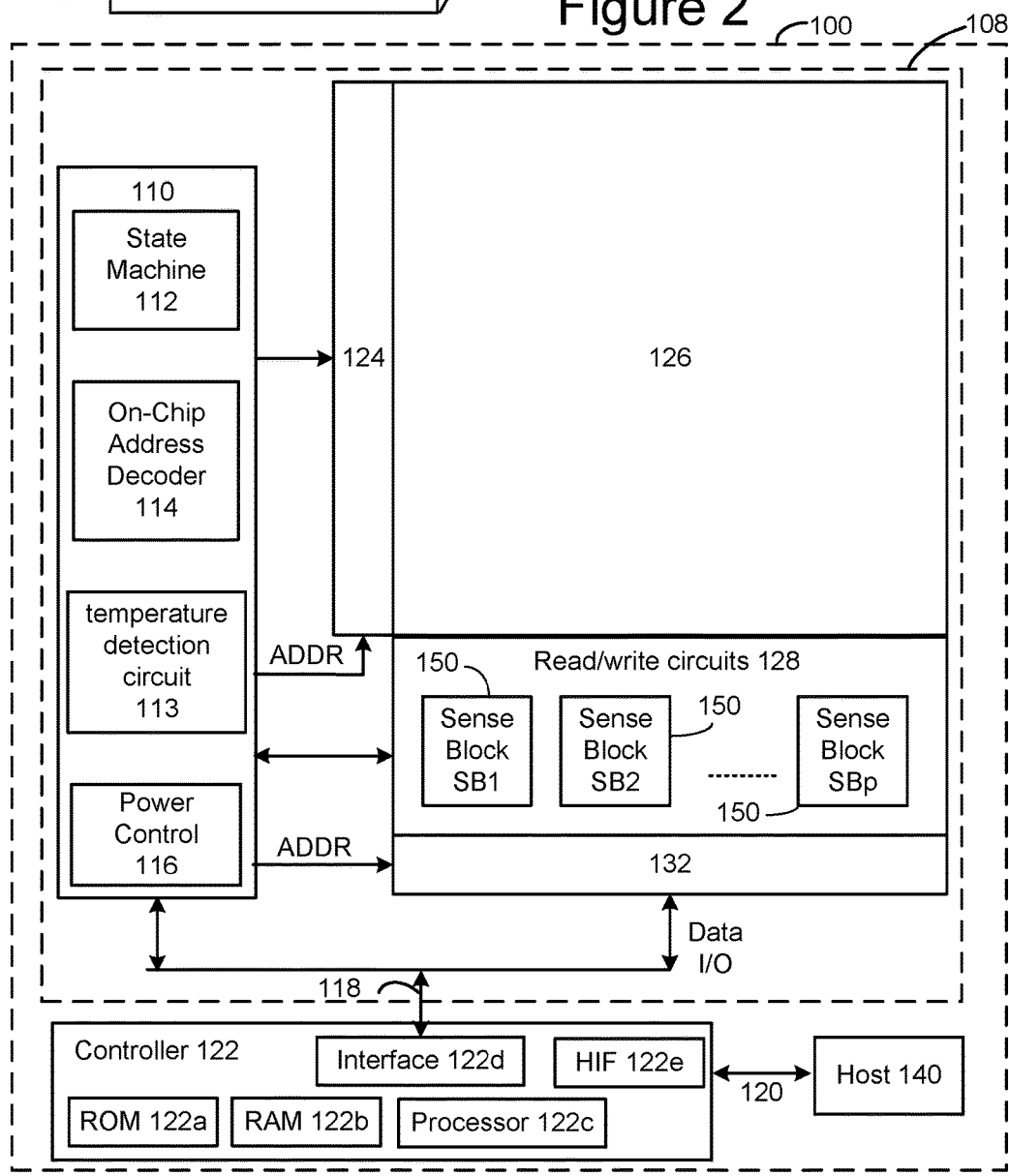
FIG. 2 is a functional block diagram of a memory device such as the 3D stacked non-volatile memory device 100 of FIG. 1.

FIG. 2 is a functional block diagram of an example memory device such as the 3D stacked non-volatile memory device 100 of FIG. 1. The components depicted in FIG. 2 are electrical circuits. Memory device 100 includes one or more memory die 108. Each memory die 108 includes a three-dimensional memory structure 126 of memory cells (such as, for example, a 3D array of memory cells), control circuitry 110, and read/write circuits 128. In other embodiments, a two-dimensional array of memory cells can be used. Memory structure 126 is addressable by word lines via a decoder 124 (row decoder) and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a Controller 122 is included in the same memory device, such as memory device 100 (e.g., a removable storage card) as the one or more memory die 108. However, in other systems, the Controller can be separated from the memory die 108. In some embodiments, the Controller will be on a different die than the memory die. In some embodiments, one Controller 122 will communicate with multiple memory die 108. In other embodiments, each memory die 108 has its own Controller. Commands and data are transferred between the host 140 and Controller 122 via a data bus 120, and between Controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithically formed three-dimensional non-volatile memory in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides chip-level control of memory operations. Temperature detection circuit 113 is configured to detect temperature, and can be any suitable temperature detection circuit known in the art. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or Controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, temperature detection circuit 113, power control module 116, sense blocks 150, read/write circuits 128, and Controller 122 can be considered one or more control circuits (or a managing circuit) that performs the functions described herein.

Controller 122 (which in one embodiment is an electrical circuit that may be on-chip or off-chip) may comprise one or more processors 122c, ROM 122a, RAM 122b, Memory interface 122d and Host Interface 122e, all of which are interconnected. One or more processors 122C is one example of a control circuit. Other embodiments can use state machines or other custom circuits designed to perform one or more functions. The storage devices (including ROM 122a, RAM 122b) comprises code such as a set of instructions, and the processor 122c is operable to execute the set of instructions to provide the functionality described herein.

Alternatively, or additionally, processor 122c can access code from a storage device in the memory structure, such as a reserved area of memory cells connected to one or more word lines. Memory interface 122d, in communication with ROM 122a, RAM 122b and processor 122c, is an electrical circuit that provides an electrical interface between Controller 122 and memory die 108. For example, memory interface 122d can change the format or timing of signals, provide a buffer, isolate from surges, latch I/O, etc. Processor 122C can issue commands to control circuitry 110 (or any other component of memory die 108) via Memory interface 122d. Host Interface 122e in communication with ROM 122a, RAM 122b and processor 122c, is an electrical circuit that provides an electrical interface between Controller 122 and host 140. For example, Host Interface 122e can change the format or timing of signals, provide a buffer, isolate from surges, latch I/O, etc. Commands and data from host 140 are received by Controller 122 via Host Interface 122e. Data sent to host 140 are transmitted via Host Interface 122e.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three-dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in they direction) with each column having multiple memory cells. The vertical columns may be arranged in a two-dimensional configuration, e.g., in an x-y plane, resulting in a three-dimensional arrangement of memory cells, with memory cells on multiple vertically stacked memory planes. Other configurations of memory elements in three dimensions can also constitute a three-dimensional memory array.

By way of non-limiting example, in a three-dimensional NAND memory array, the memory elements may be coupled together to form vertical NAND strings that traverse across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
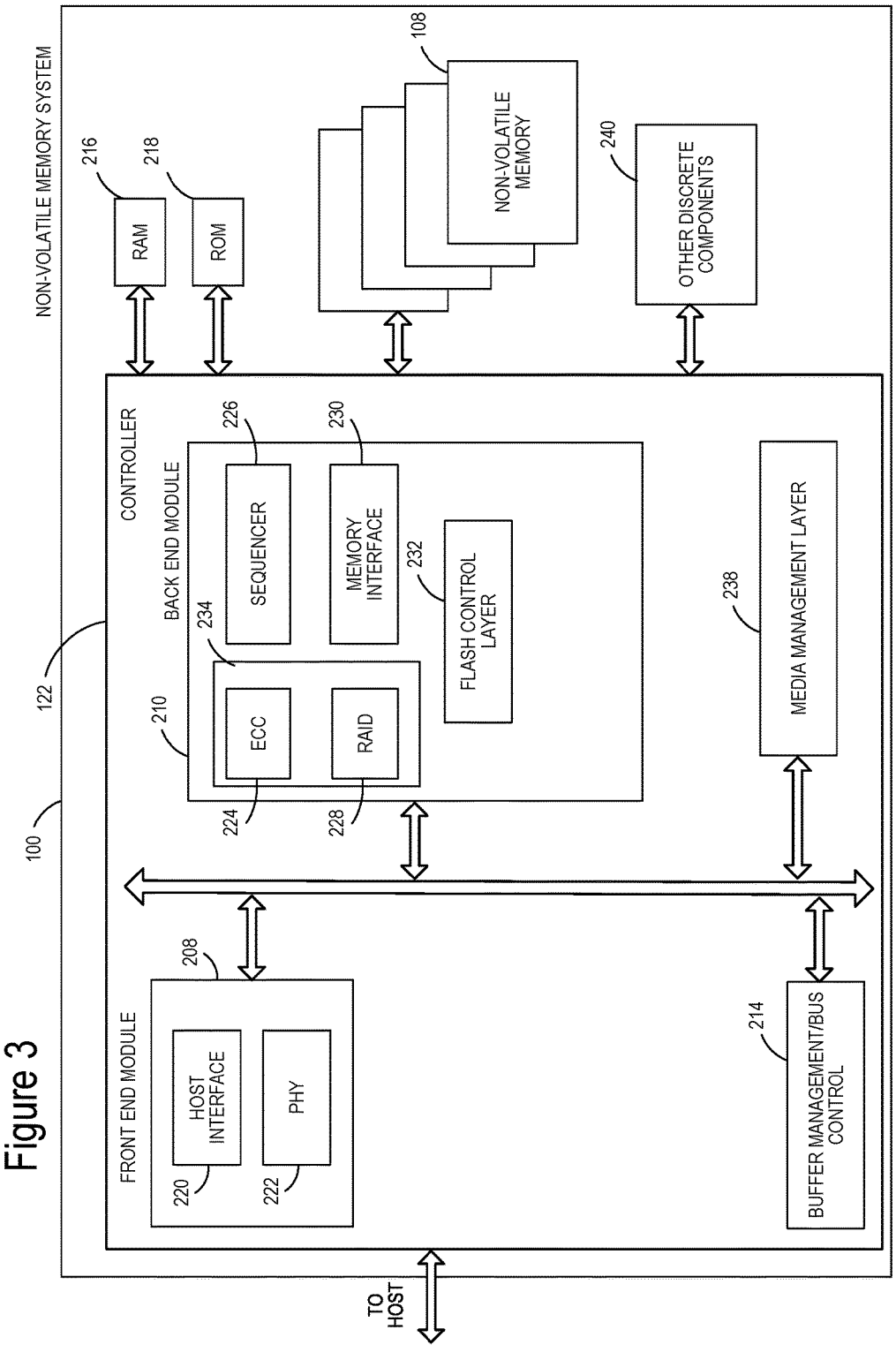
FIG. 3 is a block diagram depicting one embodiment of a Controller.

FIG. 3 is a block diagram of example non-volatile memory system 100, depicting more details of Controller 122. In one embodiment, the system of FIG. 3 is a solid-state drive (SSD). As used herein, a flash memory Controller is a device that manages data stored on flash memory and communicates with a host, such as a computer or electronic device. A flash memory Controller can have various functionality in addition to the specific functionality described herein. For example, the flash memory Controller can format the flash memory to ensure the memory is operating properly, map out bad flash memory cells, and allocate spare memory cells to be substituted for future failed memory cells. Some part of the spare memory cells can be used to hold firmware to operate the flash memory Controller and implement other features. In operation, when a host needs to read data from or write data to the flash memory, it will communicate with the flash memory Controller. If the host provides a logical address to which data is to be read/written, the flash memory Controller can convert the logical address received from the host to a physical address in the flash memory. (Alternatively, the host can provide the physical address). The flash memory Controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The communication interface between Controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid-state disk (SSD) drive installed in a personal computer.

In some embodiments, memory system 100 includes a single channel between Controller 122 and non-volatile memory die 108, the subject matter described herein is not limited to having a single memory channel. For example, in some memory system architectures, 2, 4, 8 or more channels may exist between the Controller and the memory die, depending on Controller capabilities. In any of the embodiments described herein, more than a single channel may exist between the Controller and the memory die, even if a single channel is shown in the drawings.

As depicted in FIG. 3, Controller 122 includes a front-end module 208 that interfaces with a host, a back-end module 210 that interfaces with the one or more non-volatile memory die 108, and various other modules that perform functions which will now be described in detail.

The components of Controller 122 depicted in FIG. 3 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include or comprise software stored in a processor readable device (e.g., memory) to program one or more processors for Controller 122 to perform the functions described herein. The architecture depicted in FIG. 3 is one example implementation that may (or may not) use the components of Controller 122 depicted in FIG. 2 (i.e. RAM, ROM, processor, interface). In an example, controller 122 may be formed on a single die or substrate as a System On a Chip (SOC).

Referring again to modules of the Controller 122, a buffer manager/bus Controller 214 manages buffers in random access memory (RAM) 216 and controls the internal bus arbitration of Controller 122. A read only memory (ROM) 218 stores system boot code. Although illustrated in FIG. 3 as located separately from the Controller 122, in other embodiments one or both of the RAM 216 and ROM 218 may be located within the Controller. In yet other embodiments, portions of RAM and ROM may be located both within the Controller 122 and outside the Controller. Further, in some implementations, the Controller 122, RAM 216, and ROM 218 may be located on separate semiconductor die.

Front-end module 208 includes a host interface 220 and a physical layer interface 222 (PHY) that provide the electrical interface with the host or next level storage Controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 may be a communication interface that facilitates transfer for data, control signals, and timing signals.

Back-end module 210 includes an error correction Controller (ECC) engine, ECC engine 224, that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. ECC engine 224 and RAID module 228 both calculate redundant data that can be used to recover when errors occur and may be considered examples of redundancy encoders. Together, ECC engine 224 and RAID module 228 may be considered to form a combined redundancy encoder 234. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back-end module 210.

Additional components of memory system 100 illustrated in FIG. 3 include media management layer 238, which performs wear leveling of memory cells of non-volatile memory die 108. Memory system 100 also includes other discrete components 240, such as external electrical interfaces, external RAM, resistors, capacitors, or other components that may interface with Controller 122. In alternative embodiments, one or more of the physical layer interface 222, RAID module 228, media management layer 238 and buffer management/bus Controller 214 are optional components that are not necessary in the Controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory structure 126 of memory die 108. The MML 238 may be needed because: 1) the flash memory may have limited endurance; 2) the flash memory structure 126 may only be written in multiples of pages; and/or 3) the flash memory structure 126 may not be written unless it is erased as a block (i.e. a block may be considered to be a minimum unit of erase and such a non-volatile memory may be considered a block-erasable non-volatile memory). The MML 238 understands these potential limitations of the flash memory structure 126 which may not be visible to the host. Accordingly, the MML 238 attempts to translate the writes from host into writes into the flash memory structure 126.

Controller 122 may interface with one or more memory die 108. In in one embodiment, Controller 122 and multiple memory dies (together comprising memory system 100) implement a solid-state drive (SSD), which can emulate, replace or be used instead of a hard disk drive inside a host, as a NAS device, etc. Additionally, the SSD need not be made to work as a hard drive.

Figure 4:
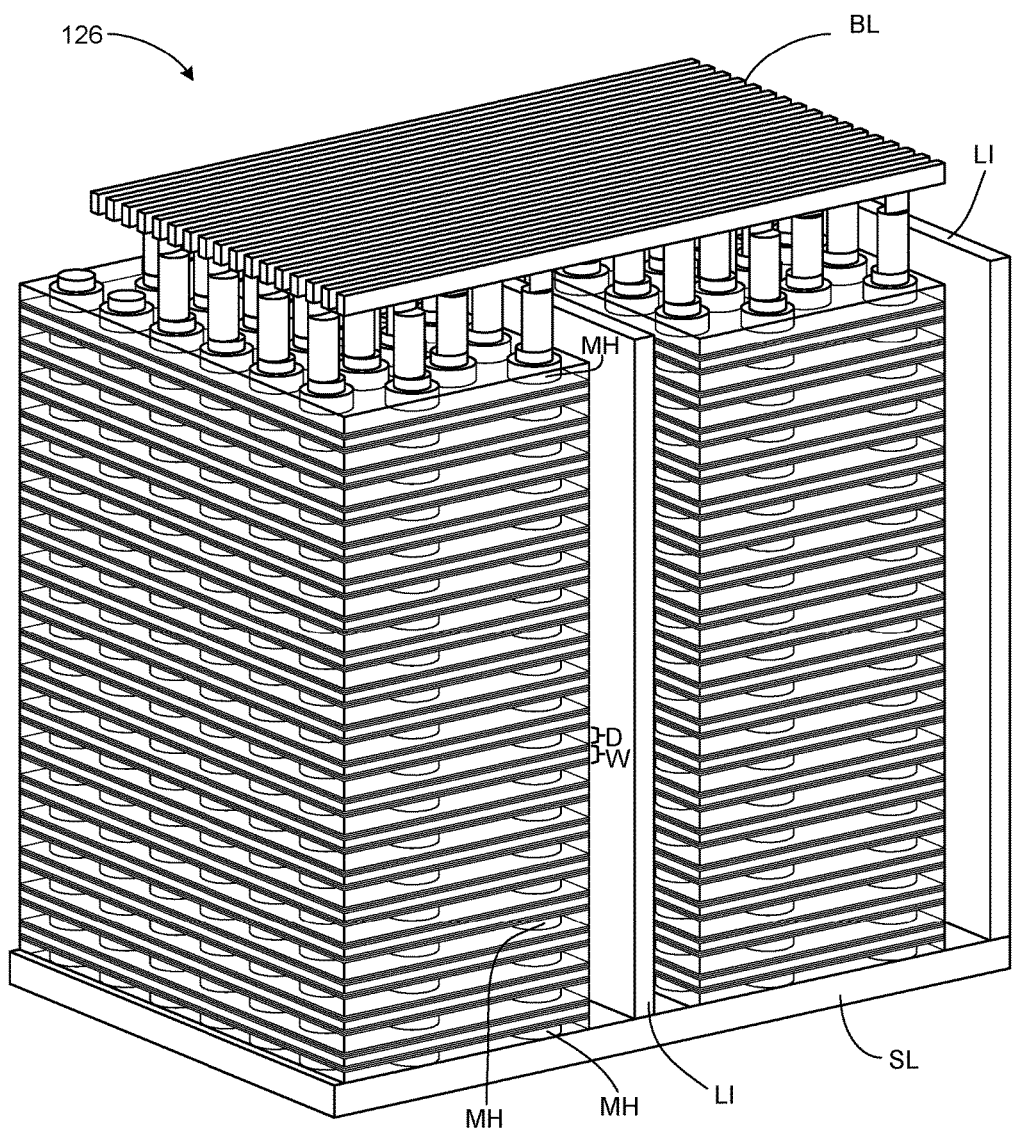
FIG. 4 is a perspective view of a portion of one embodiment of a three-dimensional monolithic memory structure.

FIG. 4 is a perspective view of a portion of a three-dimensional memory structure 126, which includes a plurality memory cells. For example, FIG. 4 shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-216 alternating dielectric layers and conductive layers, for example, 96 data word line layers, 8 select layers, 4 dummy word line layers and 108 dielectric layers. More or less than 108-216 layers can also be used. As will be explained below, the alternating dielectric layers and conductive layers are divided into four "fingers" by local interconnects LI. FIG. 4 only shows two fingers and two local interconnects LI. Below and the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data. More details of the three-dimensional memory structure 126 is provided below with respect to FIG. 4A-4F.

FIG. 4A is a block diagram explaining one example organization of memory structure 126, which is divided into two planes 302 and 304. Each plane is then divided into M blocks. In one example, each plane has about 2000 blocks. However, different numbers of blocks and planes can also be used. In one embodiment, for two plane memory, the block IDs are usually such that even blocks belong to one plane and odd blocks belong to another plane; therefore, plane 302 includes block 0, 2, 4, 6, . . . and plane 304 includes blocks 1, 3, 5, 7, . . . In on embodiment, a block of memory cells is a unit of erase. That is, all memory cells of a block are erased together. In other embodiments, memory cells can be grouped into blocks for other reasons, such as to organize the memory structure 126 to enable the signaling and selection circuits.

Figure 4B:
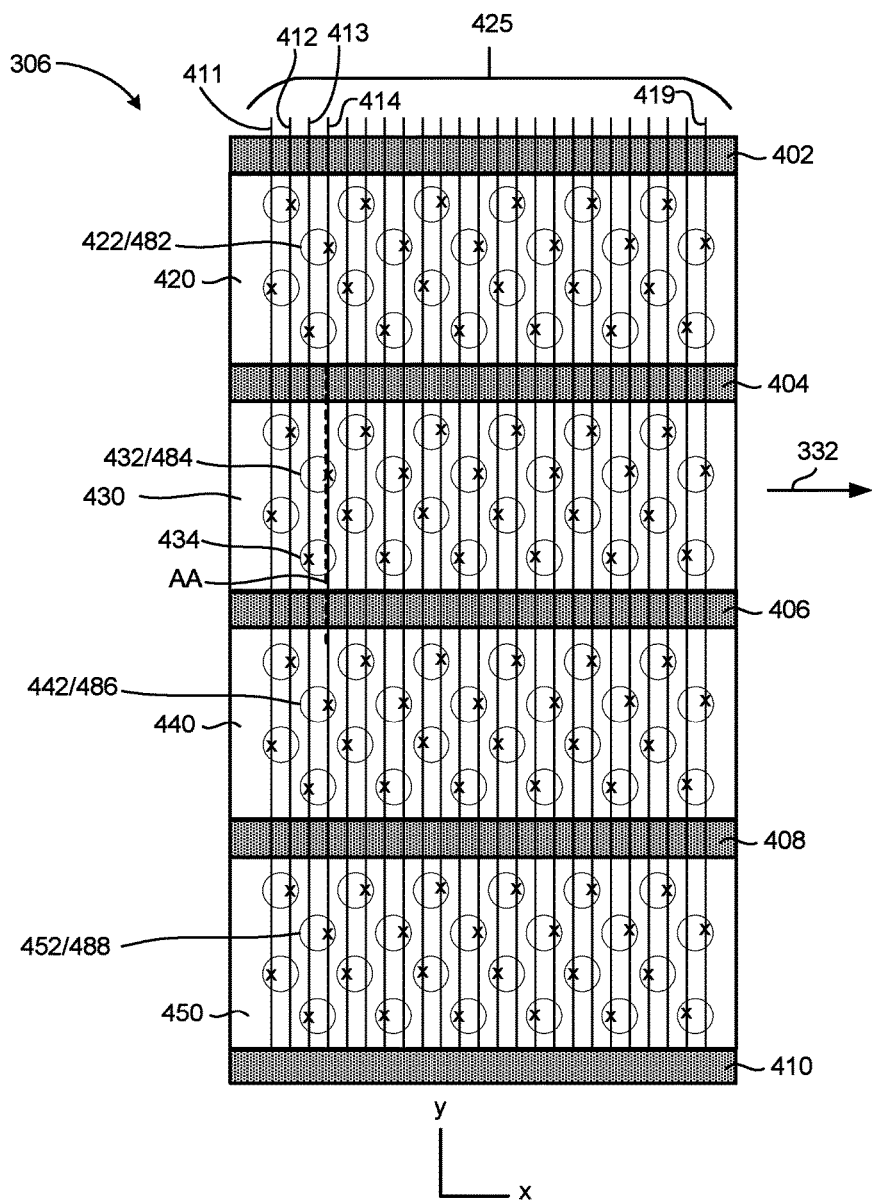
FIG. 4B depicts a top view of a portion of a block of memory cells.

FIGS. 4B-4F depict an example 3D NAND structure. FIG. 4B is a block diagram depicting a top view of a portion of one block from memory structure 126. The portion of the block depicted in FIG. 4B corresponds to portion 306 in block 2 of FIG. 4A. As can be seen from FIG. 4B, the block depicted in FIG. 4B extends in the direction of 332. In one embodiment, the memory array will have 60 layers. Other embodiments have less than or more than 60 layers. However, FIG. 4B only shows the top layer.

FIG. 4B depicts a plurality of circles that represent the vertical columns. Each of the vertical columns include multiple select transistors and multiple memory cells. In one embodiment, each vertical column implements a NAND string. For example, FIG. 4B shows vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 330 and in the direction of arrow 332, the block includes more vertical columns than depicted in FIG. 4B

FIG. 4B also depicts a set of bit lines 425, including bit lines 411, 412, 413, 414, . . . 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as word line fingers that are separated by the local interconnects. In one embodiment, the word line fingers on a common level of a block connect together at the end of the block to form a single word line. In another embodiment, the word line fingers on the same level are not connected together. In one example implementation, a bit line only connects to one vertical column in each of regions 420, 430, 440 and 450. In that implementation, each block has sixteen rows of active columns and each bit line connects to four rows in each block. In one embodiment, all of four rows connected to a common bit line are connected to the same word line (via different word line fingers on the same level that are connected together); therefore, the system uses the source side select lines and the drain side select lines to choose one (or another subset) of the four to be subjected to a memory operation (program, verify, read, and/or erase).

Although FIG. 4B shows each region having four rows of vertical columns, four regions and sixteen rows of vertical columns in a block, those exact numbers are an example implementation. Other embodiments may include more or less regions per block, more or less rows of vertical columns per region and more or less rows of vertical columns per block.

FIG. 4B also shows the vertical columns being staggered. In other embodiments, different patterns of staggering can be used. In some embodiments, the vertical columns are not staggered.

Figure 4C:
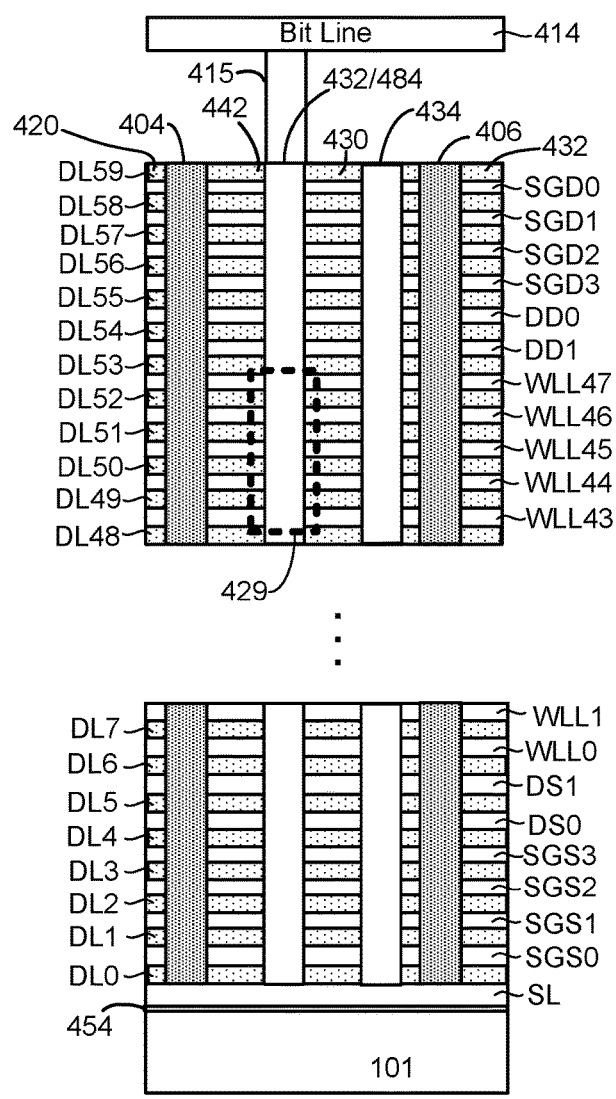
FIG. 4C depicts a cross sectional view of a portion of a block of memory cells.

FIG. 4C depicts a portion of an embodiment of three-dimensional memory structure 126 showing a cross-sectional view along line AA of FIG. 4B. This cross-sectional view cuts through vertical columns 432 and 434 and region 430 (see FIG. 4B). The structure of FIG. 4C includes four drain side select layers SGD0, SGD1, SGD2 and SGD3; four source side select layers SGS0, SGS1, SGS2 and SGS3; four dummy word line layers DD0, DD1, DS0 and DS1; and forty-eight data word line layers WLL0-WLL47 for connecting to data memory cells. Other embodiments can implement more or less than four drain side select layers, more or less than four source side select layers, more or less than four dummy word line layers, and more or less than forty-eight-word line layers (e.g., 96 word line layers). Vertical columns 432 and 434 are depicted protruding through the drain side select layers, source side select layers, dummy word line layers and word line layers. In one embodiment, each vertical column comprises a NAND string. For example, vertical column 432 comprises NAND string 484. Below the vertical columns and the layers listed below is substrate 101, an insulating film 454 on the substrate, and source line SL. The NAND string of vertical column 432 has a source end at a bottom of the stack and a drain end at a top of the stack. As in agreement with FIG. 4B, FIG. 4C show vertical column 432 connected to bit lines 414 via connector 415. Local interconnects 404 and 406 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL47 collectively are referred to as the conductive layers. In one embodiment, the conductive layers are made from a combination of TiN and Tungsten. In other embodiments, other materials can be used to form the conductive layers, such as doped polysilicon, metal such as Tungsten or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layer WLL0-WLL47 connect to memory cells (also called data memory cells). Dummy word line layers DD0, DD1, DS0 and DS1 connect to dummy memory cells. A dummy memory cell does not store user data, while a data memory cell is eligible to store user data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

FIG. 4D depicts a logical representation of the conductive layers (SGD0, SGD1, SGD2, SGD3, SGS0, SGS1, SGS2, SGS3, DD0, DD1, DS0, DS1, and WLL0-WLL47) for the block that is partially depicted in FIG. 4C. As mentioned above with respect to FIG. 4B, in one embodiment, local interconnects 402, 404, 406, 408 and 410 break up each conductive layer into four regions or fingers. For example, word line layer WLL31 is divided into regions 460, 462, 464 and 466. For word line layers (WLL0-WLL31), the regions are referred to as word line fingers; for example, word line layer WLL46 is divided into word line fingers 460, 462, 464 and 466. In one embodiment, the four word line fingers on a same level are connected together. In another embodiment, each word line finger operates as a separate word line.

Drain side select gate layer SGD0 (the top layer) is also divided into regions 420, 430, 440 and 450, also known as fingers or select line fingers. In one embodiment, the four select line fingers on a same level are connected together. In another embodiment, each select line finger operates as a separate word line.

FIG. 4E depicts a cross sectional view of region 429 of FIG. 4C that includes a portion of vertical column 432. In one embodiment, the vertical columns are round and include four layers; however, in other embodiments more or less than four layers can be included and other shapes can be used. In one embodiment, vertical column 432 includes an inner core 470 that is made of a dielectric, such as SiO$_2$. Other materials can also be used. Surrounding inner core 470 is a polysilicon channel, channel 471. Materials other than polysilicon can also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is charge trapping layer 473, such as (for example) Silicon Nitride. Other memory materials and structures can also be used. The technology described herein is not limited to any particular material or structure.

FIG. 4E depicts dielectric layers DLL49, DLL50, DLL51, DLL52 and DLL53, as well as word line layers WLL43, WLL44, WLL45, WLL46, and WLL47. Each of the word line layers includes a word line region 476 surrounded by an aluminum oxide layer 477, which is surrounded by a blocking oxide layer 478 (SiO$_2$). The physical interaction of the word line layers with the vertical column forms the memory cells. Thus, a memory cell, in one embodiment, comprises channel 471, tunneling dielectric 472, charge trapping layer 473, blocking oxide layer 478, aluminum oxide layer 477 and word line region 476. For example, word line layer WLL47 and a portion of vertical column 432 comprise a memory cell MC1. Word line layer WLL46 and a portion of vertical column 432 comprise a memory cell MC2. Word line layer WLL45 and a portion of vertical column 432 comprise a memory cell MC3. Word line layer WLL44 and a portion of vertical column 432 comprise a memory cell MC4. Word line layer WLL43 and a portion of vertical column 432 comprise a memory cell MC5. In other architectures, a memory cell may have a different structure; however, the memory cell would still be the storage unit.

When a memory cell is programmed, electrons are stored in a portion of the charge trapping layer 473 which is associated with the memory cell. These electrons are drawn into the charge trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming a non-volatile storage system is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Figure 4F:
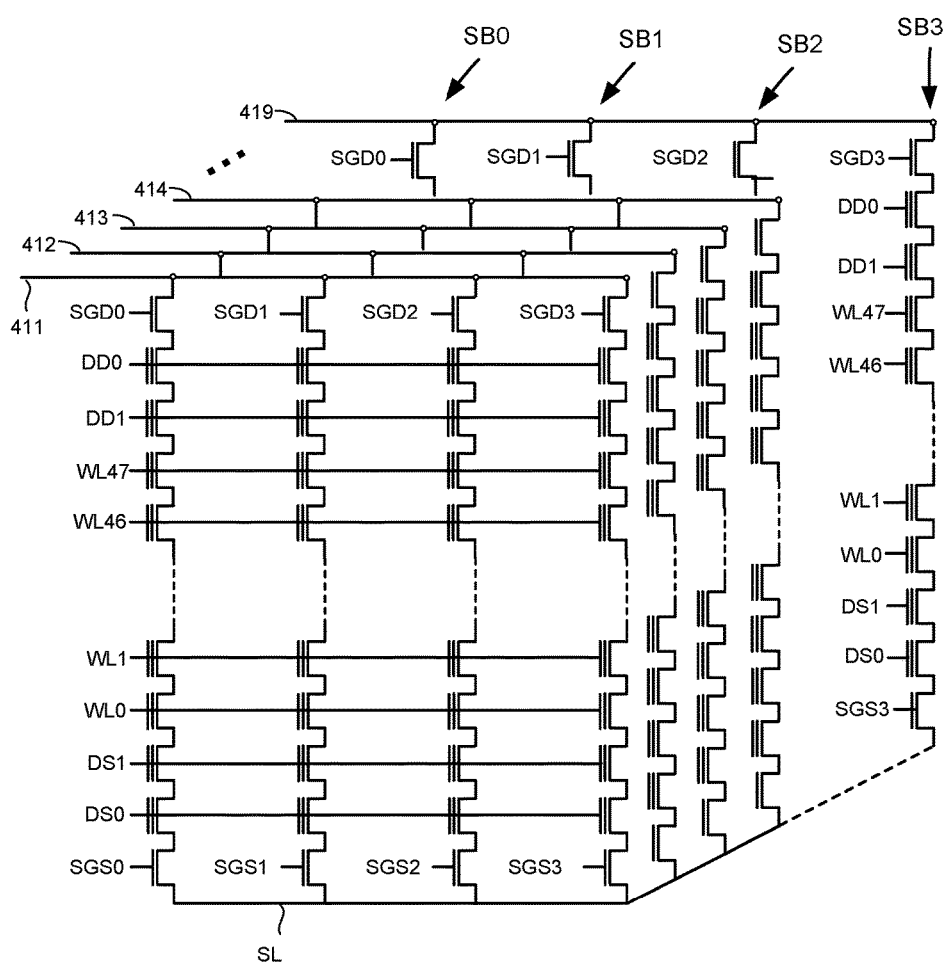
FIG. 4F is a schematic of a plurality of NAND strings.

FIG. 4F shows physical word lines WLL0-WLL47 running across the entire block. The structure of FIG. 4G corresponds to portion 306 in Block 2 of FIGS. 4A-F, including bit lines 411, 412, 413, 414, . . . 419. Within the block, each bit line connected to four NAND strings. Drain side select lines SGD0, SGD1, SGD2 and SGD3 are used to determine which of the four NAND strings connect to the associated bit line. The block can also be thought of as divided into four sub-blocks SB0, SB1, SB2 and SB3. Sub-block SB0 corresponds to those vertical NAND strings controlled by SGD0 and SGS0, sub-block SB1 corresponds to those vertical NAND strings controlled by SGD1 and SGS1, sub-block SB2 corresponds to those vertical NAND strings controlled by SGD2 and SGS2, and sub-block SB3 corresponds to those vertical NAND strings controlled by SGD3 and SGS3.

Although the example memory system of FIGS. 4-4F is a three-dimensional memory structure that includes vertical NAND strings with charge-trapping material, other (2D and 3D) memory structures can also be used with the technology described herein. For example, floating gate memories (e.g., NAND-type and NOR-type flash memory ReRAM memories, magnetoresistive memory (e.g., MRAM), and phase change memory (e.g., PCRAM) can also be used.

One example of a ReRAM memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming a non-volatile storage system, each memory cell lies between a pair of write lines arranged at right angles to each other, parallel to the memory cell, one above and one below the memory cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

Non-volatile memory circuits are often combined with other circuits to form a system (e.g. a memory system or data storage system) which in turn may form a subsystem of a larger system (e.g. phone, tablet, laptop, etc.) along with other systems (e.g. communication system, sound system, user interface, etc.). Voltage regulation may be provided at one or more levels, e.g. a central voltage regulator may provide power to subsystems and/or voltage regulators within subsystems may regulate voltage to components of a subsystem. Voltage regulation may be on-chip, where the voltage regulator is on the same chip, die, or substrate as the circuit or circuits that it provides power to, or may be off-chip, where the voltage regulator is on a different chip, die, or substrate to the circuit or circuits that it provides power to, or some combination, e.g. a voltage regulator on a substrate may provide power to some circuits on the same substrate and some circuits that are not on the same substrate. A range of voltage regulator configurations may be used and the present technology is not limited to a particular configuration. While various examples are described herein with respect to non-volatile memory systems, it will be understood that aspects of the present technology are applicable to other systems that receive electrical power.

Figure 5:
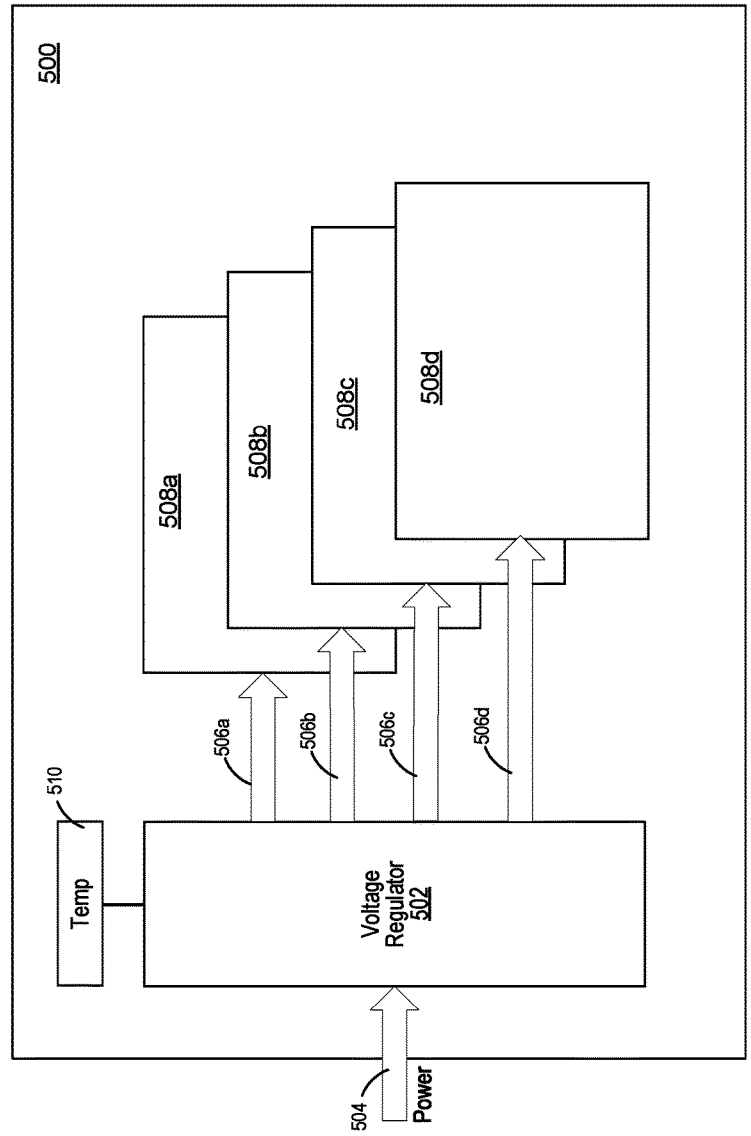
FIG. 5 shows an example of a voltage regulator in a system.

FIG. 5 illustrates an example of a system 500 that includes a voltage regulator 502 that receives power 504 (e.g. from a host system, from a battery, or from another source) and provides power outputs 506a-d to different subsystems 508a-d. For example, voltage regulator 502 may be incorporated in a non-volatile memory system such as non-volatile memory system 100 of FIG. 3 to provide power to subsystems such as Controller 122, non-volatile memory die 108, and/or other discrete components 240. For example, voltage regulator 502 may be configured to provide power outputs 506a-d in one or more supply voltage ranges (e.g. 3.3+/−0.2 volts).

Voltage regulator 502 is coupled to temperature transducer 510, which is configured to provide a temperature input to voltage regulator 502. Temperature transducer 510 may use a PN junction diode to measure temperature and may be similar to temperature detection circuit 113 discussed above. Such a temperature transducer may be located on a common die with one or more other circuits, e.g. on a common die with voltage regulator 502 or one or more components of a subsystem of 508a-d (e.g. on a memory die as shown in FIG. 1, where temperature detection circuit 113 is located in non-volatile memory device 100). Alternatively, temperature transducer 510 may be a separate component. Temperature transducer 510 may be considered a means for measuring a temperature. In some systems, a package, or enclosure extends about components of a system and maintains components in a common temperature range (i.e. differences in temperature between components may be small compared with temperature differences between the components and external temperature outside the enclosure). Thus, a single temperature transducer may indicate temperature for multiple components. In other examples, more than one temperature transducer may indicate temperature at multiple locations of a system.

Temperature transducer 510 may be configured to indicate an overtemperature condition of system 500, which may cause voltage regulator 502 to reduce, or turn off, power outputs 506a-d. In the case of a high-temperature condition, voltage regulator 502 may treat all subsystems 506a-d equally (reducing or switching off power to all subsystems together) even though some subsystems may not be generating significant heat. Similarly, when power consumption exceeds or approaches a power limit, voltage regulator 502 may treat all subsystems 506a-d equally even though some subsystems may not be consuming significant power.

Figure 6:
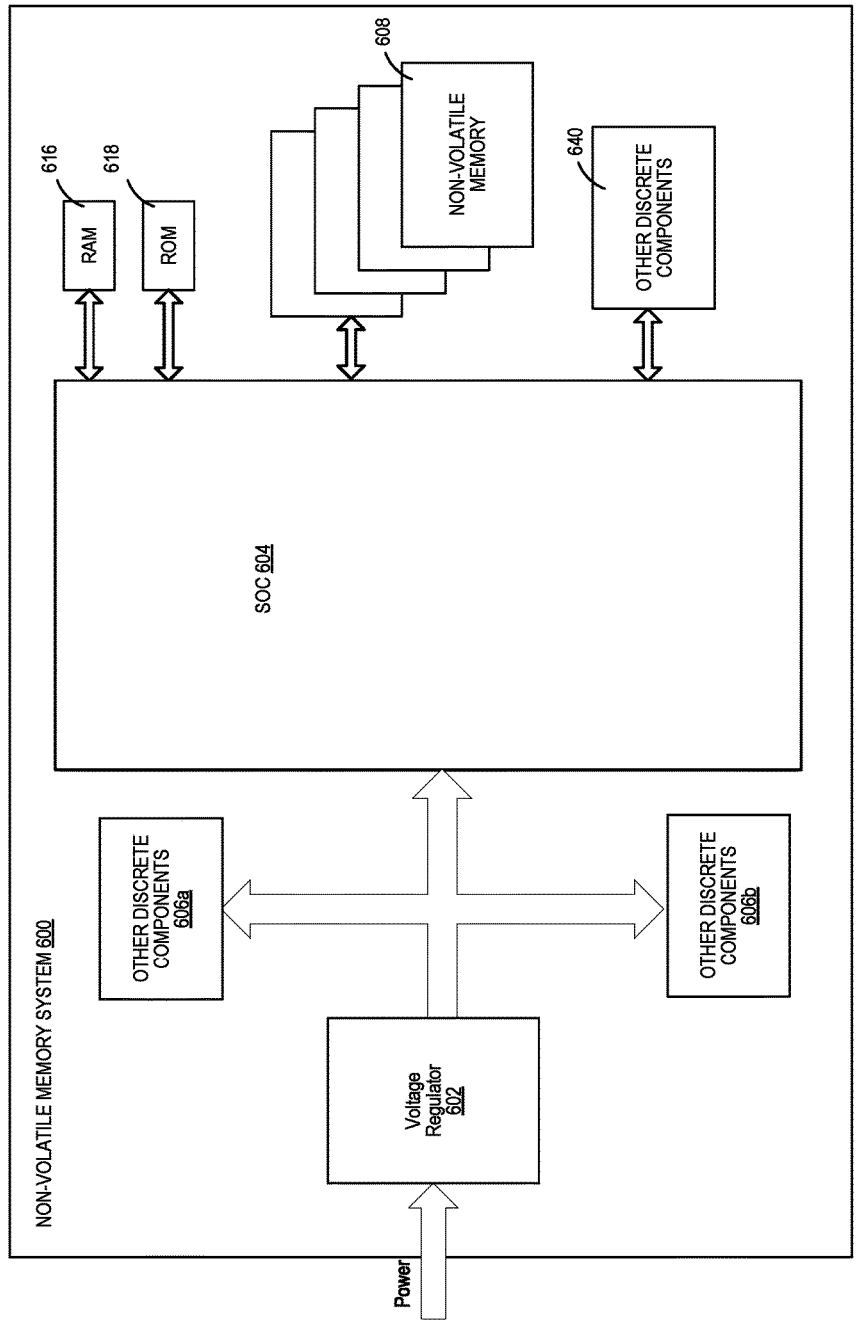
FIG. 6 shows an example of a voltage regulator in a non-volatile memory system.

A system or apparatus, such as a non-volatile memory system, may include a voltage regulator in a number of different configurations. FIG. 6 shows an example of a non-volatile memory system 600 that includes a voltage regulator 602 that is coupled to provide electrical power to a System On a Chip (SOC) 604 and to other discrete components 606a, 606b. Voltage regulator 602 is located on a separate die or chip to SOC 604 and may be considered an off-chip voltage regulator. SOC 604 may include components similar to controller 122 so that SOC may be configured as a controller that is coupled to non-volatile memory 608, RAM 616, ROM 618, and other discrete components 640. In addition to supplying power to SOC 604, voltage regulator 602 may supply power to other components of non-volatile memory system 600 including one or more of non-volatile memory 608, RAM 616, ROM 618, and other discrete components 640. A non-volatile memory system such as non-volatile memory system 600 may receive power through a host interface and may have a power budget that limits the power that it can draw from the host. A non-volatile memory system such as non-volatile memory system 600 may be disposed in a package, housing, or enclosure. Temperature of non-volatile memory system 600 may be measured by one or more temperature transducers (not shown in FIG. 6) and detection of a temperature above a temperature limit may trigger a reduction or turning-off of power from voltage regulator 602.

Figure 7:
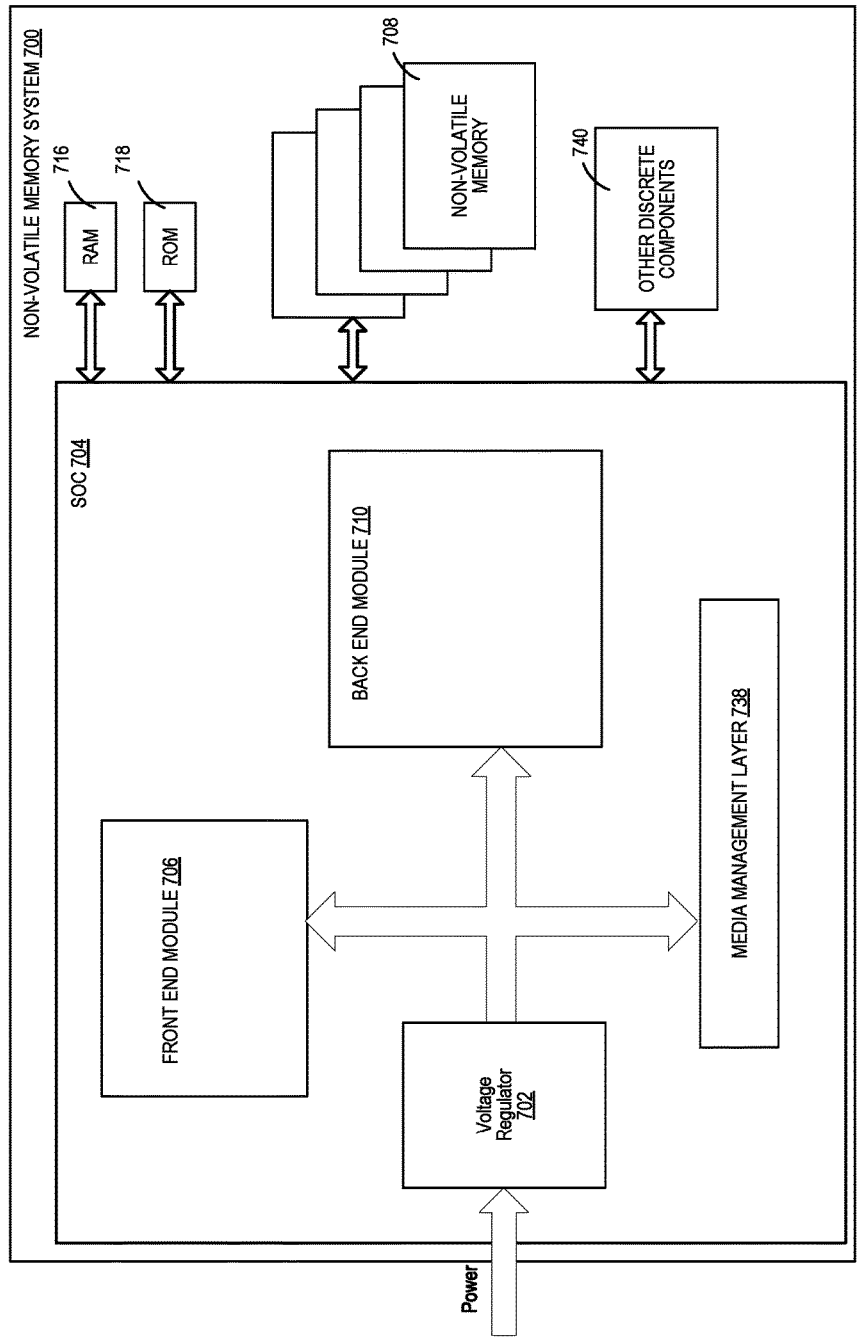
FIG. 7 shows an example of an on-chip voltage regulator in a non-volatile memory system.

FIG. 7 shows an example of a non-volatile memory system 700 that includes a voltage regulator 702 that is part of an SOC 704 and is configured to supply electrical power to components of SOC 704. Voltage regulator 702 and other components of SOC 704 are located on the same die so that voltage regulator 702 may be considered an on-chip voltage regulator. SOC 704 may include components similar to those of controller 122 so that SOC 704 may be configured as a controller that is coupled to non-volatile memory 708, RAM 716, ROM 718, and other discrete components 740. In addition to supplying power to other components of SOC 704, such as front-end module 706, back end module 710, and media management layer 738, voltage regulator 702 may supply power to other components of non-volatile memory system 700 including one or more of non-volatile memory 708, RAM 716, ROM 718, and other discrete components 740 (e.g. through one or more interfaces). A non-volatile memory system such as non-volatile memory system 700 may receive power through a host interface and may have a power budget that limits the power that it can draw from the host. A non-volatile memory system such as non-volatile memory system 700 may be disposed in a package, housing, or enclosure. Temperature of non-volatile memory system 600 may be measured by one or more temperature transducers (not shown in FIG. 7), which may be in SOC 704, or elsewhere. Detection of a temperature above a temperature limit may trigger a reduction or turning-off of power from voltage regulator 702.

Aspects of the present technology allow more efficient use of a power budget while avoiding temperatures that exceed a temperature limit. In an example, a voltage regulator, in addition to providing electrical power in a supply voltage range, also provides an indicator of electrical current supplied so that power, current, and/or temperature may be efficiently maintained within desired ranges. Electrical current or power may be measured for one or more outputs to one or more components and separate adjustment may be made to keep within a power/current budget and to maintain overall temperature within a desired range while continuing to operate at least some operations of some components.

Figure 8:
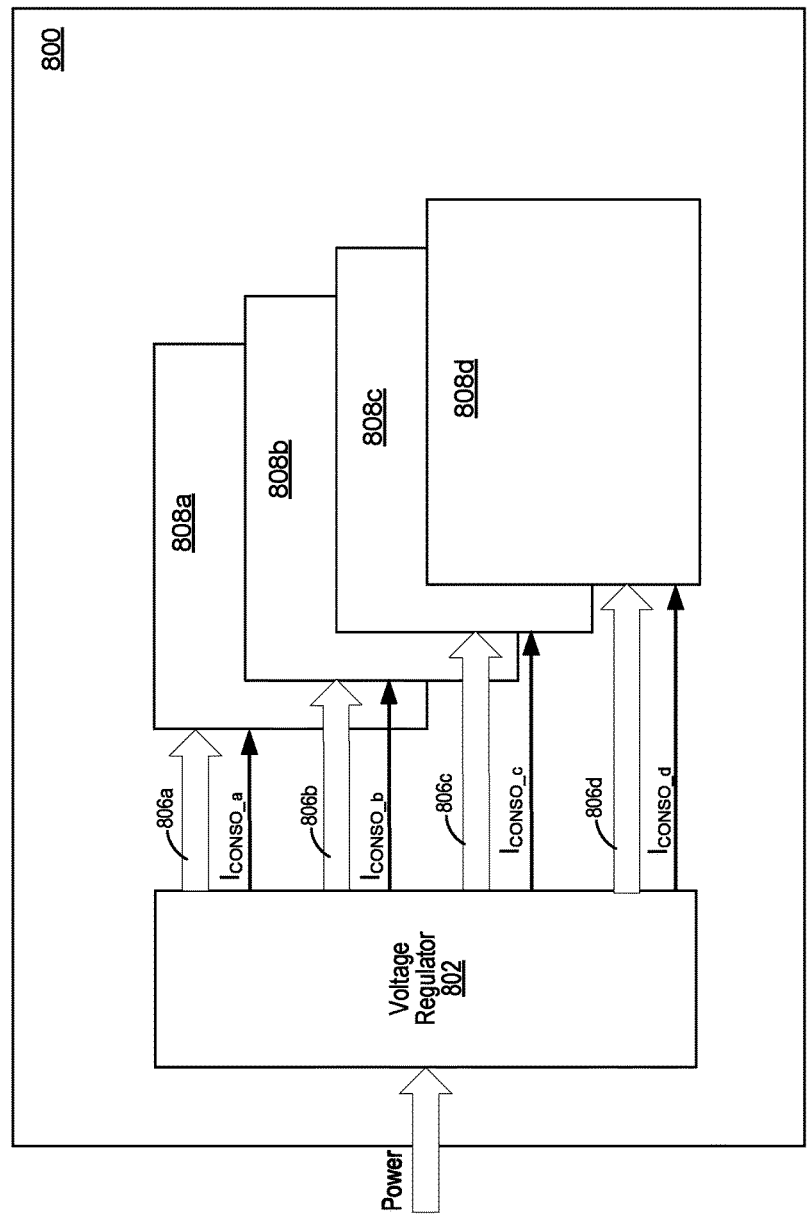
FIG. 8 illustrates a voltage regulator generating indicators of current provided.

FIG. 8 shows an example of a system 800 that includes a voltage regulator 802 and subsystems 808a-d. In addition to providing electrical power outputs 806a-d to subsystems 808a-d respectively in a voltage supply range, voltage regulator 802 provides indicators of respective electrical currents ($I_{CONSO\_a}$ to $I_{CONSO\_d}$) of electrical power outputs 806a-d. Thus, $I_{CONSO\_a}$ is an indicator of the current provided to subsystem 808a by electrical power output 806a, $I_{CONSO\_b}$ is an indicator of the current provided to subsystem 808b by electrical power output 806b, $I_{CONSO\_c}$ is an indicator of the current provided to subsystem 808c by electrical power output 806c, and $I_{CONSO\_d}$ is an indicator of the current provided to subsystem 808d by electrical power output 806d. A voltage regulator may provide any number of indicators of current to any number of subsystems in this manner, where subsystems may be multi-IC subsystems (e.g. a subsystem includes multiple ICs such as a non-volatile memory controller and one or more non-volatile memory dies), single IC subsystems (e.g. each subsystem is separate IC, such as an SOC), or different circuits of an IC (e.g. front-end module, back-end module, and other components of a non-volatile memory controller).

An indicator of electrical current provided to a circuit, such as $I_{CONSO\_a}$, may allow operation of the circuit such as a circuit of subsystem 808a, to be managed according to the indicator, which can provide certain advantages. For example, individual subsystems 808a-d may monitor their current consumption and may reduce their individual consumption as appropriate to maintain their consumption below a power or current limit. Thus, where system 800 imposes individual subsystem power budgets for subsystems 808a-d, each subsystem may maintain its consumption within its respective power budget based on real-time measurement. This may allow a circuit to continue operation with relatively high current (close to its limit) where a model-based system might reduce current and/or reduce operations based on a predicted current consumption (e.g. a model may build in a margin of error while real-time monitoring may allow fuller use of an available power budget). Monitoring electrical current consumption may be performed individually as shown in FIG. 8 or in any other suitable manner.

Figure 9:
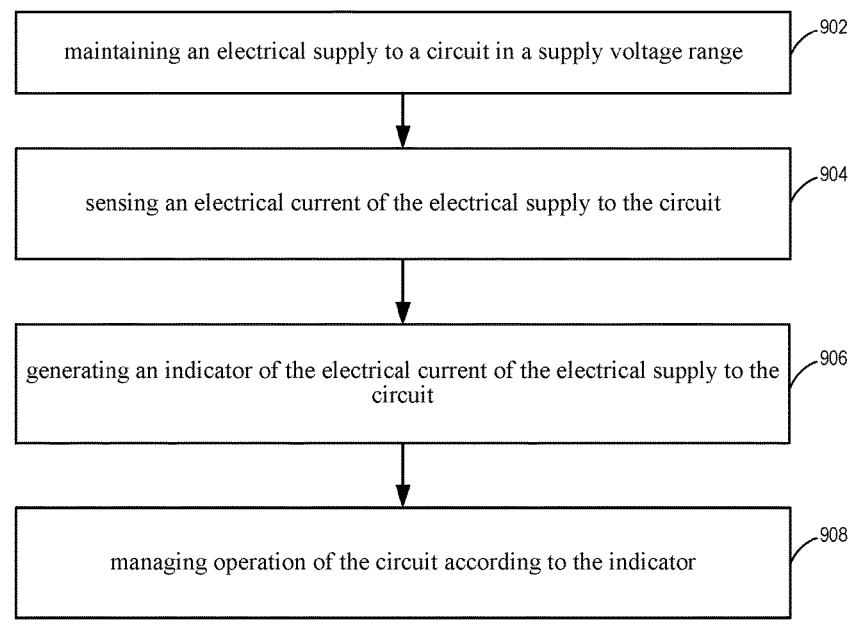
FIG. 9 illustrates an example of a method that includes generating an indicator of electrical current.

FIG. 9 illustrates an example of a method of operating a system that includes a voltage regulator. The method includes maintaining an electrical supply to a circuit (e.g. subsystem 808a) in a supply voltage range 902, sensing an electrical current of the electrical supply to the circuit 904, generating an indicator of the electrical current of the electrical supply to the circuit 906 (e.g. $I_{CONSO\_a}$), and managing operation of the circuit according to the indicator 908. Managing operation of the circuit according to the indicator may include, for example, reducing activity in response to the electrical current exceeding a current limit, or in response to a temperature reaching a predetermined limit.

While the example of FIG. 8 shows an arrangement where indicators $I_{CONSO\_a}$ to $I_{CONSO\_d}$ of electrical power outputs 806a-d are provided to respective subsystems 808a-d so that each subsystem can manage its own operations, other arrangements may be implemented. A method according to FIG. 9 may be implemented in the arrangement of FIG. 8 or some other arrangement.

Figure 10:
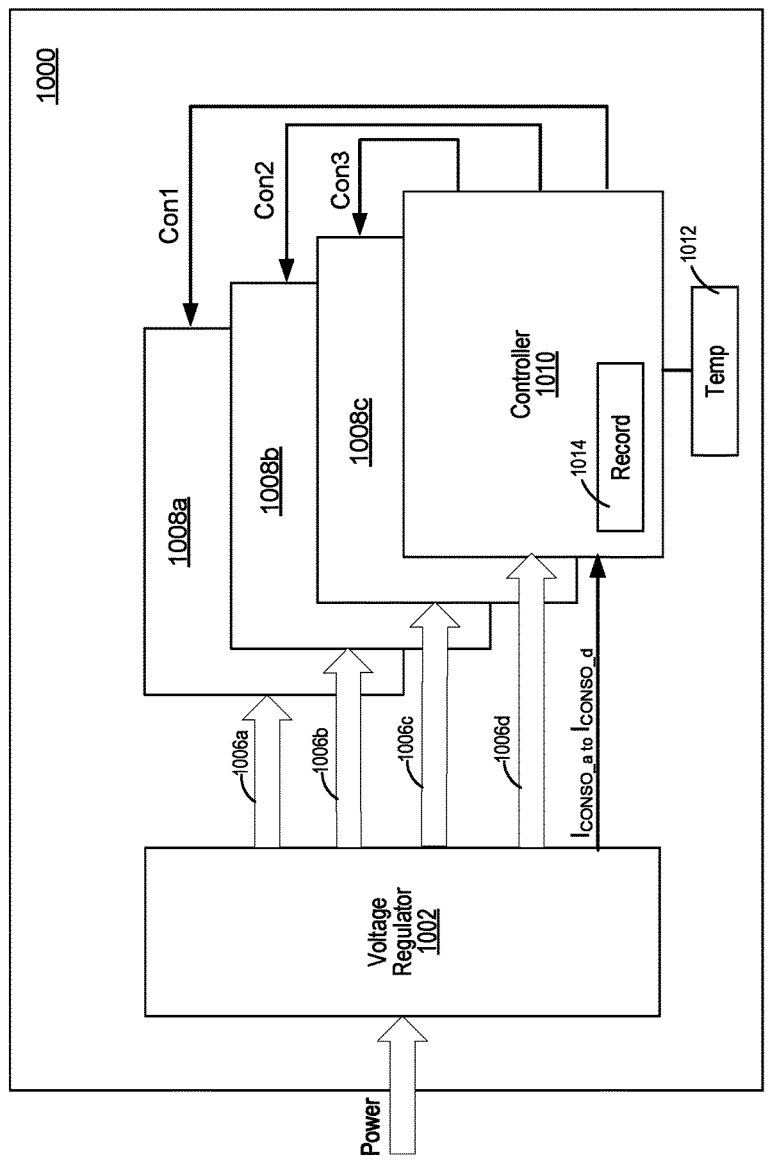
FIG. 10 illustrates an example of a voltage regulator sending indicators of current to a controller.

FIG. 10 shows an example of system 1000, in which voltage regulator 1002 provides power outputs 1006a-c to circuits 1008a-c and provides power output 1006d to controller 1010. Currents of each power output 1006a-d are measured and corresponding indicators $I_{CONSO\_a}$ to $I_{CONSO\_d}$ are generated. Instead of providing individual indicators of current to each circuit (as in FIG. 8), here indicators of currents ($I_{CONSO\_a}$ to $I_{CONSO\_d}$) are provided to controller 1010. Controller 1010 may manage its own operations according to Iconso_d (indicator of current provided by power output 1006d to controller 1010). In addition, controller 1010 may provide control signals Con_a to Con_c to circuits 1008a-c respectively to thereby manage operation of circuits 1008a-c. Control signals Con_a to Con_c may be clock signals, where a faster clock (higher frequency) signal generally speeds up operations of the receiving circuit and thus increases power consumption, and a slower clock generally slows operations of the receiving circuit and thus decreases power consumption. Other control signals may also be used.

Operations of circuits 1008a-c and controller 1010 may be individually managed according to respective indicators of currents ($I_{CONSO\_a}$ to $I_{CONSO\_d}$) so that system 1000 may operate similarly to system 800 (with management of operations performed by controller 1010 instead of being performed by individual circuits). Operations of circuits 1008a-c and controller 1010 may also be managed in a coordinated manner by controller 1010. For example, where system 1000 has a power budget, controller 1010 may coordinate between circuits to prioritize certain operations while maintaining combined power consumption within the budget (e.g. reducing power consumption by one circuit while another circuit performs an important operation that may require significant power). Controller 1010 is coupled to temperature transducer 1012 (which may be external to controller 1010, or off-chip, or may be internal, or on-chip). Controller 1010 may coordinate management of operations of circuits 1008a-c and of controller 1010 to maintain a temperature below a temperature limit in an efficient manner based on real-time temperature measurement by temperature transducer 1012.

It will be understood that temperature of a system such as system 1000 depends not only on the heat generated by the system, but also depends on the external temperature. Thus, a power limit alone may not be sufficient to avoid an overtemperature condition (e.g. a system in a phone in direct sun on a hot day may exceed a temperature limit with little or no power consumption, while the same system in a cold environment may operate below the temperature limit even when using power near the power limit). A model used to avoid overtemperature conditions may be based on a worst-case temperature scenario and on a model of power consumption, which may force a system to reduce power consumption unnecessarily. Managing operations of the circuits according to real-time temperature and current measurement may allow more efficient operation while staying within power and temperature limits. Such management may be proactive, e.g. taking action to avoid an overtemperature condition (thereby avoiding a power-saving mode or shut-down) and/or may be reactive (efficiently managing operations when temperature is high to reduce power consumption without unnecessary impacting some operations).

In an example, temperature transducer 1012 may measure temperature and provide the temperature measurement to controller 1010 so that controller 1010 can monitor temperature (controller 1010 and/or temperature transducer 1012 are monitoring temperature in this example). Controller 1010 may use temperature data in a number of ways. For example, controller 1010 may perform recording electrical current consumption and temperature over a period of time to correlate certain patterns of electrical current consumption with certain temperatures (e.g. with an overtemperature or high temperature condition). When such patterns are identified they may be recorded (e.g. in a record 1014 maintained in controller 1010) and controller 1010 may monitor electrical current consumption to detect a matching pattern and take preemptive action (e.g. reducing power consumption before an overtemperature occurs). For example, a pattern of memory controller activity indicated by current consumption may be predictive of a temperature exceeding a temperature limit and the memory controller may be configured to adjust memory controller activity to thereby avoid exceeding the temperature limit.

In an example, controller 1010 may identify a particular circuit from circuits 1008a-c as a temperature aggressor (a circuit that is generating sufficient heat to have a significant impact on overall system temperature) based on monitoring indicators $I_{CONSO\_a}$ to $I_{CONSO\_d}$. Thus, while temperature may be substantially similar for all circuits 1008a-c due to their physical arrangement, current consumption may indicate which circuit is generating heat and appropriate action may be taken (e.g. targeting one or more circuit). For example, controller 1010 may slow or stop operations of an aggressor circuit via a control signal from control signals Con1-3. In some cases, controller 1010 may prioritize operations to efficiently stay within power and temperature limits. For example, some operations that would use significant power may be deferred at times when temperature and/or power consumption approach a limit, while more important operations and/or operations using less power may continue to be performed.

Figure 11:
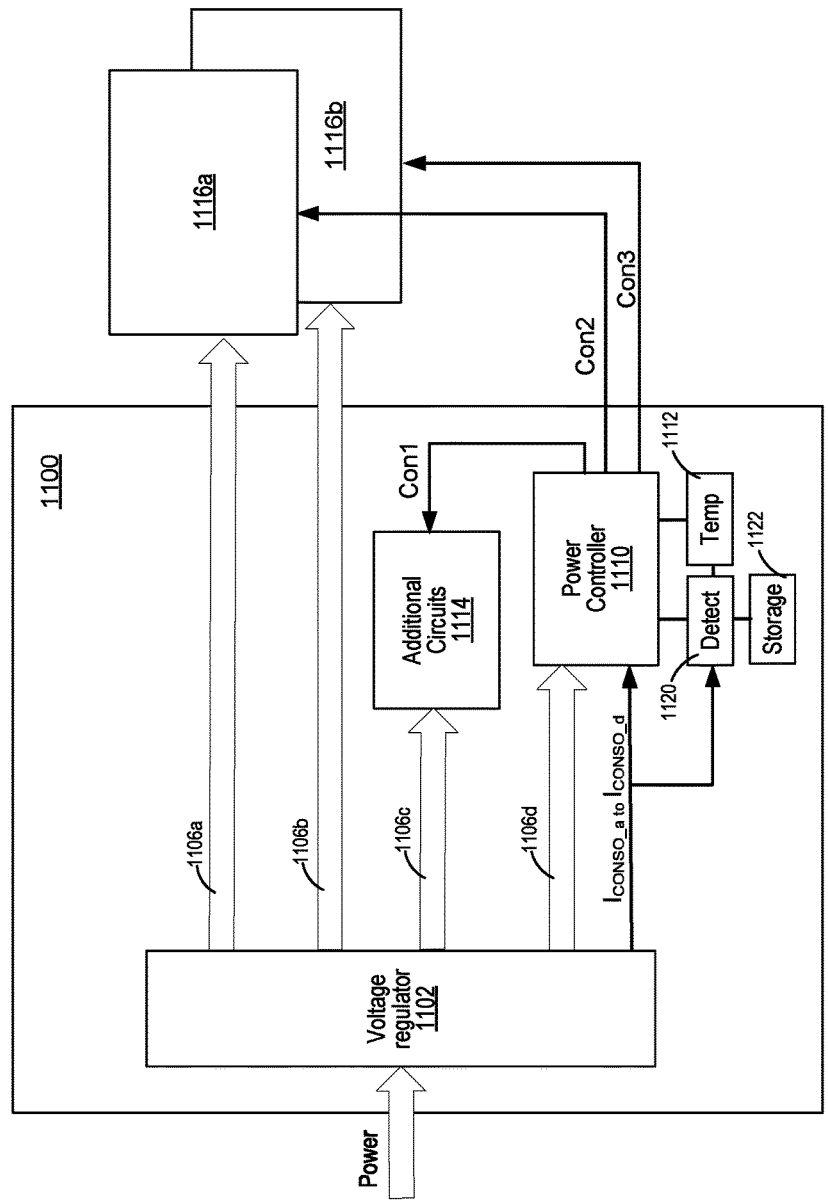
FIG. 11 illustrates a voltage regulator providing power to components on the same die and on other dies.

FIG. 11 shows an example of an implementation where a voltage regulator 1102 is formed as part of a SOC 1100 that includes a power controller 1110 and additional circuits 1114. For example, additional circuits 1114 may include one or more of the components of controller 122 illustrated in FIG. 3, or SOC 704 of FIG. 7. External circuits 1116a-b are coupled to SOC 1100 and receive power and control signals from SOC 1100. Voltage regulator 1102 provides power supplies 1106a-b to external circuits 1116a-b respectively. Voltage regulator 1102 also provides an electrical power output 1106d to power controller 1110 and electrical power output 1106c to additional circuits 1114 of SOC 1100. For example, SOC 1100 may be an SOC in a non-volatile memory system that includes one or more control circuits (e.g. additional circuits 1114) that are configured to manage memory access and external circuits 1116a-b may be non-volatile memory units (e.g. non-volatile memory dies, banks, or modules) that are managed by the control circuits.

Voltage regulator 1102 provides indicators $I_{CONSO\_a}$ to $I_{CONSO\_d}$ of respective electrical currents of electrical power outputs 1106a-d to power controller 1110. Thus, $I_{CONSO\_a}$ is an indicator of the current provided to external circuit 1116a by electrical power output 1106a, $I_{CONSO\_b}$ is an indicator of the current provided to external circuit 1116b by electrical power output 1106b, $I_{CONSO\_c}$ is an indicator of the current provided to additional circuits 1114 by electrical power output 1106c, and $I_{CONSO\_d}$ is an indicator of the current provided to power controller 1110 by electrical power output 1106d. In response to indicators $I_{CONSO\_a}$ to $I_{CONSO\_d}$ power controller 1110 controls power consumption of external circuits 1116a-b, additional circuits 1114 and itself (power controller 1110). For example, power controller 1110 sends a control signal, Con1 to additional circuits 1114 to control power consumption by additional circuits 1114. While FIG. 11 shows a single electrical power output 1106c to additional circuits 1114 and a single corresponding indicator $I_{CONSO\_c}$ it will be understood that multiple additional power supplies may be provided to multiple additional circuits and multiple corresponding additional indicators of respective additional electrical currents may be provided to power controller 1110 to allow separate power control of different circuits of SOC 1100. Power controller 1110 also sends control signals Con2 and Con3 to external circuits 1116a-b respectively to control their respective power consumption levels.

In some examples, operation of a circuit may affect operation and power consumption of one or more other circuits. For example, where external circuits 1116a-b are non-volatile memory circuits and additional circuits 1114 include one or more circuits configured to access external circuits 1116a-b (e.g. circuits such as back end module 710, media management layer 738, etc.) operation of additional circuits 1114 may affect operation of external circuits 1116a-b. Non-volatile memory dies may operate at a pace that is largely dependent on how frequently memory access operations are performed. By slowing down one or more operations of a memory controller, operation of corresponding non-volatile memory units (e.g. dies, banks, or modules) may slow down accordingly. Thus, separate control signals such as Con2 and Con3 may be unnecessary in some cases and power consumption of some components such as external circuits 1116a-b may be achieved indirectly through control of corresponding components of SOC 1100.

SOC 1100 includes temperature transducer 1112, which measures temperature of SOC 1100 and provides a real-time temperature measurement to power controller 1110. Temperature transducer 1112 may be considered a means for measuring a temperature. A pattern detection circuit 1120 receives temperature measurements from temperature transducer 1112 and also receives indicators $I_{CONSO\_a}$ to $I_{CONSO\_d}$ of respective electrical currents of electrical power outputs 1106a-d, which it uses to detect a pattern of current consumption that correlates with a temperature, or temperatures (e.g. a temperature above a limit). A pattern that correlates with such a temperature is recorded in storage 1122 (which may be considered a means for recording current and temperature data). Storage 1122 may be formed as a discrete circuit of SOC 1100, or may be a shared circuit (e.g. memory component used for multiple functions) and may be located outside SOC 1100 in some examples (e.g. located in an external memory component). Pattern detection circuit 1120 may monitor electrical consumption to detect a pattern that matches one or more patterns of electrical current consumption previously stored in storage 1122. Pattern detection circuit may be considered a means for identifying one or more patterns of measured current associated with a high temperature. When such a pattern is detected by pattern detection circuit 1120, it provides an input to power controller 1110 and in response, power controller 1110 may control power consumption to reduce power consumption of one or more circuits and thereby prevent an unwanted temperature condition (e.g. an over-temperature condition). Power controller 1110 may be considered a means for managing power consumption by a power consuming unit (e.g. by external circuits 1116a-b and/or additional circuits 1114) in response to an indicator of current (e.g. ICONSO_a to ICONSO_d) and the temperature (e.g. from temperature transducer 1112).

Figure 12:
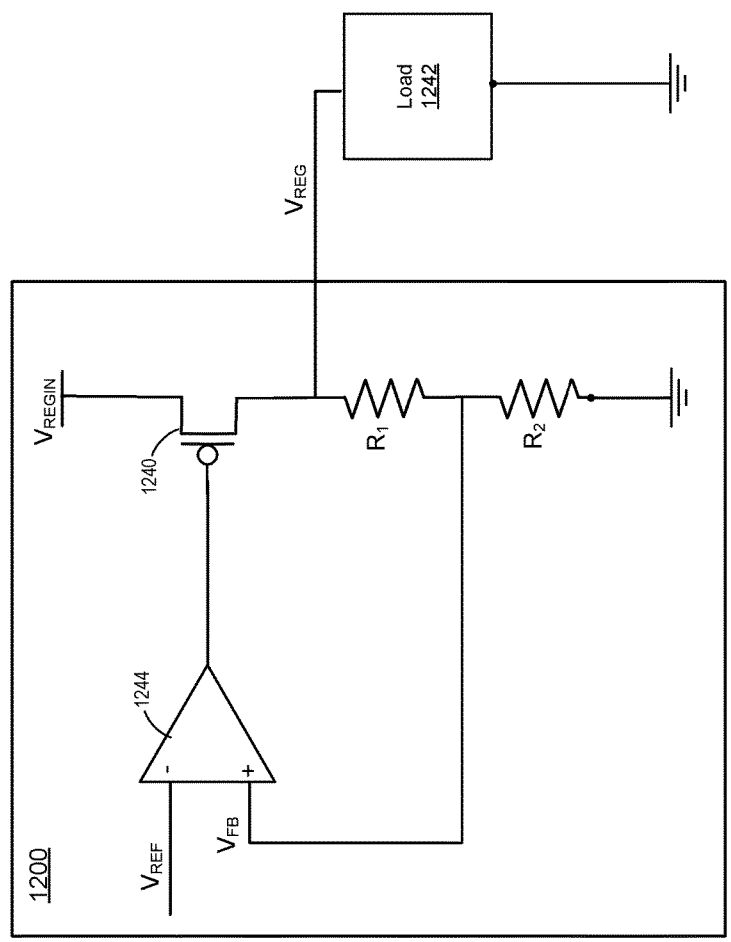
FIG. 12 shows a schematic illustration of a voltage regulator.

Aspects of the present technology may be implemented using various voltage regulator designs. FIG. 12 shows an example of a voltage regulator 1200 that may be used to provide electrical power to a circuit, or multiple circuits (e.g. to a subsystem or component of a system such as a non-volatile memory system) e.g. as voltage regulator 502, 602, or 702 of FIGS. 5-7. Voltage regulator 1200 receives an input voltage $V_{REGIN}$ that may come from a host system, a battery, or other source. $V_{REGIN}$ is coupled the source terminal of a power transistor, PMOS 1240, and the drain of PMOS 1240 provides a regulated output $V_{REG}$ to a load 1242 (e.g. to a circuit, component, or subsystem that consumes electrical power in a voltage range). The drain of PMOS 1240 is connected to ground through a voltage divider formed by resistors R1 and R2. A feedback voltage $V_{FB}$ between resistors R1 and R2 is fed to an input of an amplifier 1244, which also receives a reference voltage $V_{REF}$ and generates a control voltage $V_{CON}$ according to the difference between $V_{FB}$ and $V_{REF}$. $V_{CON}$ is coupled to the gate of PMOS 1240 to control PMOS 1240 and thus control regulated output voltage $V_{REG}$. Voltage regulator 1200 acts to maintain $V_{REG}$ at a substantially constant voltage. Voltage regulator 1200 may be considered a means for regulating a voltage to a power consuming unit such as a circuit, component, or subsystem and may be considered a low drop out (LDO) regulator.

Figure 13:
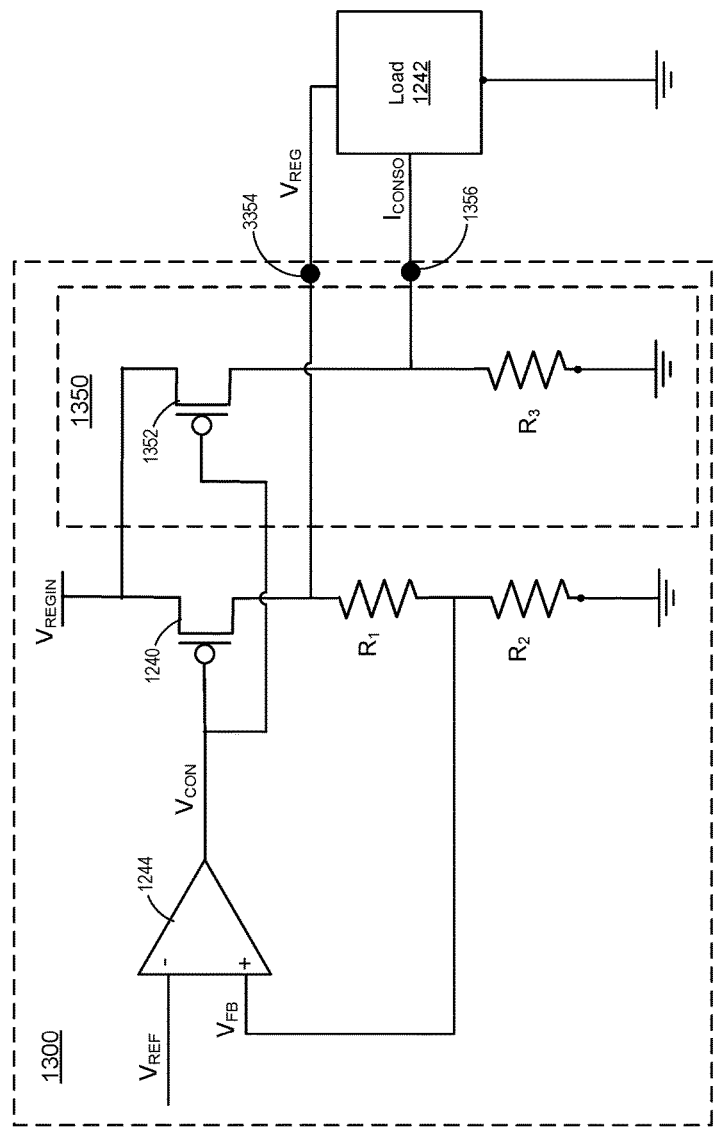
FIG. 13 shows a schematic illustration of a voltage regulator with a current sensing circuit.

FIG. 13 shows an example of a voltage regulator 1300 that includes a current sensing circuit 1350 configured to sense the electrical current provided to load 1242 (i.e. to sense the current output of voltage regulator 1300) and is otherwise similar to voltage regulator 1200. Voltage regulator 1300 may be configured, for example, as voltage regulator 802 of FIG. 8, voltage regulator 1002 of FIG. 10, or voltage regulator 1102 of FIG. 11. Current sensing circuit 1350 includes a sense transistor 1352 (in this example a PMOS transistor that is smaller than PMOS 1240) which is connected in parallel with PMOS 1240 so that input voltage $V_{REGIN}$ is coupled to the source terminal of PMOS 1240 and to the source terminal of the sense transistor 1352, the feedback signal $V_{FB}$ is coupled to a first input of amplifier 1244, a reference voltage $V_{REF}$ is coupled to a second input of amplifier 1244, an output $V_{CON}$ of amplifier 1244 is coupled to a gate of PMOS 1240 and the gate of the sense transistor 1352. A first output terminal 1354 connected to the drain terminal of PMOS 1240 provides regulated output voltage $V_{REG}$ while a second output terminal 1356 connected to the drain terminal of sense transistor 1352 provides an indicator ($I_{CONSO}$) to of current provided at the first terminal. Indicator $I_{CONSO}$ may be a voltage that is proportional to the current provided at first terminal 3354. In the example of FIG. 13, the indicator of electrical current, $I_{CONSO}$, is provided to load 1242 so that power consumption of load 1242 can be controlled in response to the indicator. In other examples, $I_{CONSO}$ may be sent to a controller or other circuit that controls current consumption of load 1242. For example, load 1242 may include a controller configured to limit consumption of electrical current provided by the first output terminal 1354 to less than a predetermined current limit. Current sensing circuit 1350 may be considered a means for measuring a current provided to a power consuming unit such as load 1242 voltage regulator 1300 (e.g. by a means for regulating a voltage) and generating an indicator of the current provided to the power consuming unit.

Figure 14:
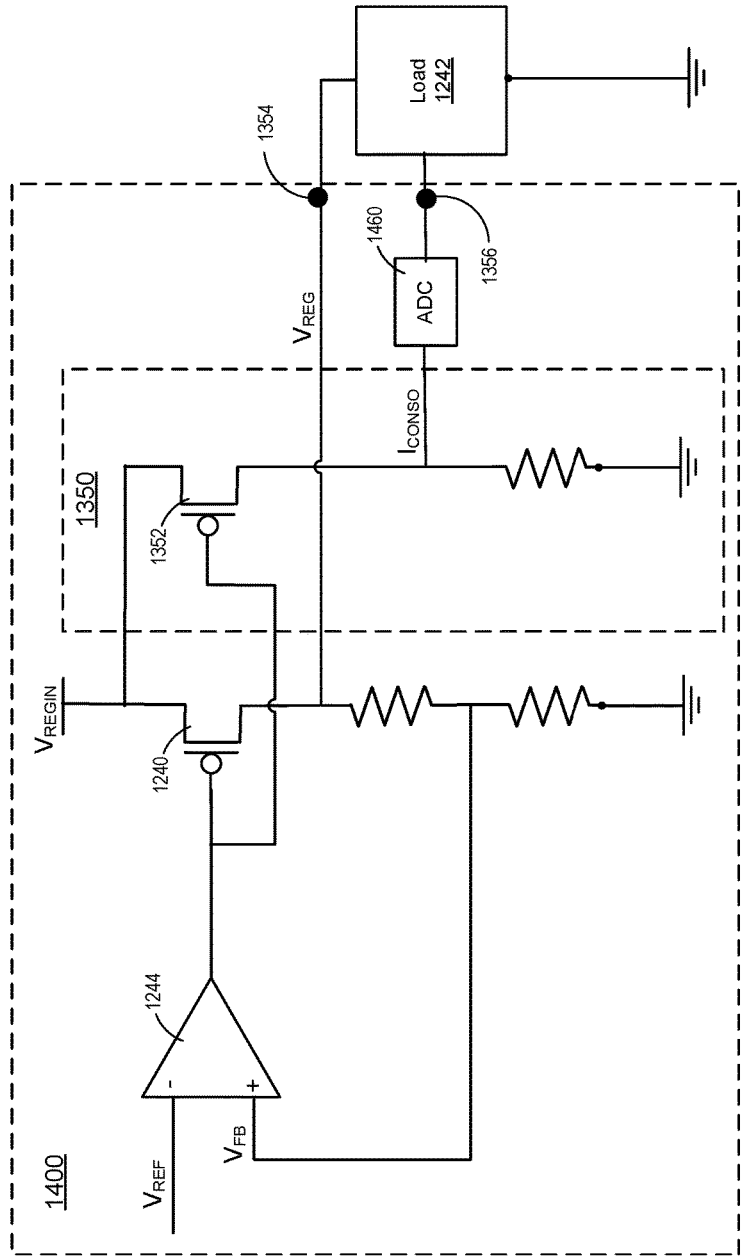
FIG. 14 shows a schematic illustration of a voltage regulator with a current sensing circuit and an analog-to-digital converter.

FIG. 14 shows an example of a voltage regulator that includes a current sensing circuit 1350 as shown in FIG. 13 and additionally includes an analog to digital converter (ADC) 1460 coupled to the second output terminal 1356 to provide a digital indicator of electrical current provided at first output terminal 1354. ADC 1460 is coupled to receive indicator $I_{CONSO}$ and convert it to a digital output that is then provided to load 1242. Thus, an indicator of electrical current may be provided as an analog voltage, as a digital output, or in any other suitable format.

An example of an apparatus includes a circuit and a voltage regulator having a first output terminal that is coupled to provide electrical power to the circuit, the voltage regulator configured to provide the electrical power in a supply voltage range, the voltage regulator having a second output terminal configured to provide an indicator of electrical current provided by the first output terminal for control of the circuit.

The second output terminal may be coupled to provide the indicator of electrical current to the circuit, the circuit may have a power consumption that is controllable, and the circuit may be configured to control the power consumption in response to the indicator of electrical current. The second output terminal may be coupled to provide the indicator of electrical current to a controller that is coupled to the circuit, the circuit may have a power consumption that is controllable, and the controller may be configured to control the power consumption of the circuit in response to the indicator of electrical current. The controller may be configured to control the power consumption of the circuit by modifying a frequency of a signal provided to the circuit. The circuit and the voltage regulator may be located on a substrate. The circuit may be located on a first substrate and the voltage regulator may be located on a second substrate. The circuit may be a memory controller that is configured to limit consumption of electrical current provided by the first output terminal to less than a predetermined current limit. The apparatus may include a temperature transducer and a pattern detection circuit that is configured to detect a pattern of memory controller activity that is predictive of a temperature that exceeds a temperature limit, the memory controller may be configured to adjust memory controller activity to not exceed the temperature limit. The apparatus may include a monolithically formed three-dimensional non-volatile memory coupled to the memory controller. The voltage regulator may include a power transistor controlled according to a feedback signal and a sense transistor connected in parallel with the power transistor, the sense transistor controlled according to the feedback signal to provide a voltage to the second output terminal that varies with electrical current provided by the first output terminal. An input voltage may be coupled to a source terminal of the power transistor and a source terminal of the sense transistor, the feedback signal may be coupled to a first input of an amplifier, a reference voltage may be coupled to a second input of the amplifier, an output of the amplifier may be coupled to a gate of the power transistor and a gate of the sense transistor, the first output terminal may be connected to a drain terminal of the power transistor and the second output terminal may be connected to a drain terminal of the sense transistor. An analog to digital converter may be coupled to the second output terminal to provide a digital indicator of electrical current provided by the first output terminal.

An example of a method includes maintaining an electrical supply to a circuit in a supply voltage range; sensing an electrical current of the electrical supply to the circuit; generating an indicator of the electrical current of the electrical supply to the circuit; and managing operation of the circuit according to the indicator.

The circuit may be a controller and managing operation of the controller according to the indicator may include reducing controller activity in response to the electrical current exceeding a current limit. The method may further include monitoring temperature; identifying one or more patterns of electrical current consumption associated with temperatures above a temperature limit; and reducing controller activity in response to a pattern of electrical current consumption associated with a temperature above the temperature limit. Identifying the one or more patterns of electrical current consumption associated with temperatures above the temperature limit may include: recording electrical current consumption and temperature over a period of time to correlate temperatures above the temperature limit with the one or more patterns of electrical current consumption by the controller; recording the one or more patterns of electrical current consumption as associated with temperatures above the temperature limit; and monitoring electrical current consumption to detect a pattern that matches the one or more patterns of electrical current consumption by the controller. The method may further include sensing one or more additional electrical currents provided to one or more additional circuits; generating one or more additional indicators of the one or more additional electrical currents provided to the one or more additional circuits; and managing operation of the circuit and the one or more additional circuits according to the indicator and the one or more additional indicators. The method may further include measuring a temperature associated with the circuit and the one or more additional circuits; in response to the temperature exceeding a threshold temperature, identifying a power aggressor from among the circuit and the one or more additional circuits; and reducing power consumption by the power aggressor.

An example of an apparatus includes means for regulating a voltage to a power consuming unit; means for measuring a current provided to the power consuming unit by the means for regulating a voltage and generating an indicator of the current provided to the power consuming unit; means for measuring a temperature; and means for managing power consumption by the power consuming unit in response to the indicator of the current and the temperature.

The apparatus may further include means for recording current and temperature data; and means for identifying one or more patterns of measured current associated with a high temperature from recorded current and temperature data.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
   a circuit;
   a voltage regulator having a first output terminal that is coupled to provide electrical power to the circuit, the voltage regulator configured to provide the electrical power in a supply voltage range, the voltage regulator having a second output terminal configured to provide an indicator of electrical current provided by the first output terminal for control of the circuit;
   a temperature transducer;
   a pattern storage circuit; and
   a pattern detection circuit coupled to receive the indicator of electrical current from the voltage regulator and receive the temperature measurements from the temperature transducer, the pattern detection circuit configured to identify one or more patterns of electrical current and temperature and store the one or more patterns in the pattern storage circuit for controlling power consumption of the circuit.

2. The apparatus of claim 1 wherein the second output terminal is coupled to provide the indicator of electrical current to the circuit, the circuit has a power consumption that is controllable, and the circuit is configured to control the power consumption in response to the indicator of electrical current.

3. The apparatus of claim 1 wherein the second output terminal is coupled to provide the indicator of electrical current to a controller that is coupled to the circuit, the circuit has a power consumption that is controllable, and the controller is configured to control the power consumption of the circuit in response to the indicator of electrical current.

4. The apparatus of claim 3 wherein the controller is configured to control the power consumption of the circuit by modifying a frequency of a signal provided to the circuit.

5. The apparatus of claim 1 wherein the circuit and the voltage regulator are located on a substrate.

6. The apparatus of claim 1 wherein the circuit is located on a first substrate and the voltage regulator is located on a second substrate.

7. The apparatus of claim 1 wherein the circuit is a memory controller that is configured to limit consumption of electrical current provided by the first output terminal to less than a predetermined current limit.

8. The apparatus of claim 7 wherein the pattern detection circuit that is configured to detect a pattern of memory controller activity that is predictive of a temperature that exceeds a temperature limit, the memory controller configured to adjust memory controller activity to not exceed the temperature limit.

9. The apparatus of claim 7 further comprising a monolithically formed three dimensional non-volatile memory coupled to the memory controller.

10. The apparatus of claim 1 wherein the voltage regulator comprises a power transistor controlled according to a feedback signal and a sense transistor connected in parallel with the power transistor, the sense transistor controlled according to the feedback signal to provide a voltage to the second output terminal that varies with electrical current provided by the first output terminal.

11. The apparatus of claim 10 wherein an input voltage is coupled to a source terminal of the power transistor and a source terminal of the sense transistor, the feedback signal is coupled to a first input of an amplifier, a reference voltage is coupled to a second input of the amplifier, an output of the amplifier is coupled to a gate of the power transistor and a gate of the sense transistor, the first output terminal is connected to a drain terminal of the power transistor and the second output terminal is connected to a drain terminal of the sense transistor.

12. The apparatus of claim 1 further comprising an analog to digital converter coupled to the second output terminal to provide a digital indicator of electrical current provided by the first output terminal.

13. A method, comprising:
maintaining an electrical supply to a circuit in a supply voltage range;
sensing an electrical current of the electrical supply to the circuit;
generating an indicator of the electrical current of the electrical supply to the circuit;
managing operation of the circuit according to the indicator;
wherein the circuit is a controller and wherein managing operation of the controller according to the indicator includes reducing controller activity in response to the electrical current exceeding a current limit;
monitoring temperature;
identifying one or more patterns of electrical current consumption associated with temperatures above a temperature limit, including
recording electrical current consumption and temperature over a period of time to correlate temperatures above the temperature limit with the one or more patterns of electrical current consumption by the controller;
recording the one or more patterns of electrical current consumption as associated with temperatures above the temperature limit;
monitoring electrical current consumption to detect a pattern that matches the one or more patterns of electrical current consumption by the controller; and
reducing controller activity in response to a pattern of electrical current consumption associated with a temperature above the temperature limit.

14. The method of claim 13 further comprising:
sensing one or more additional electrical currents provided to one or more additional circuits;
generating one or more additional indicators of the one or more additional electrical currents provided to the one or more additional circuits; and
managing operation of the circuit and the one or more additional circuits according to the indicator and the one or more additional indicators.

15. The method of claim 14 further comprising:
measuring a temperature associated with the circuit and the one or more additional circuits;
in response to the temperature exceeding a threshold temperature, identifying a power aggressor from among the circuit and the one or more additional circuits; and
reducing power consumption by the power aggressor.

16. An apparatus, comprising:
means for regulating a voltage to a power consuming unit;
means for measuring a current provided to the power consuming unit and generating an indicator of the current provided to the power consuming unit;
means for measuring a temperature;
means for managing power consumption by the power consuming unit in response to the indicator of the current and the temperature;
means for recording current and temperature data; and
means for identifying one or more patterns of measured current associated with a high temperature from recorded current and temperature data.

* * * * *